US012775650B1

(12) United States Patent
Rubin-Schwarz et al.

(10) Patent No.: US 12,775,650 B1
(45) Date of Patent: Oct. 27, 2026

(54) AUTOMATED TOOL FOR USING A LARGE LANGUAGE MODEL TO SELECT AND PROVIDE USER-SPECIFIC DWELLING-RELATED INFORMATION OF MULTIPLE TYPES

(71) Applicant: MFTB Holdco, Inc., Seattle, WA (US)

(72) Inventors: Andreas Rubin-Schwarz, San Mateo, CA (US); Niranjan Krishna Ravichandran, Livermore, CA (US); Kim Hung Chau, Jersey City, NJ (US); Raghav Jajodia, Jersey City, NJ (US); Gowri Kumaraguruapran, Mountain House, CA (US); Rajendra Waman Shioramwar, San Ramon, CA (US); Ashwani Kapoor, Union City, CA (US); Rama Krishna Raju Samantapudi, Georgetown, TX (US)

(73) Assignee: MFTB Holdco, Inc., Seattle, WA (US)

( * ) Notice: Subject to any disclaimer, the term of this patent is extended or adjusted under 35 U.S.C. 154(b) by 169 days.

(21) Appl. No.: 18/922,084

(22) Filed: Oct. 21, 2024

(51) Int. Cl.

| | |
|---|---|
| ***G06Q 50/16*** | (2024.01) |
| ***G06F 16/334*** | (2025.01) |
| ***G06F 16/335*** | (2019.01) |
| ***G06F 16/338*** | (2019.01) |

(Continued)

(52) U.S. Cl.
CPC ........ *G06F 16/3344* (2019.01); *G06F 16/335* (2019.01); *G06F 16/338* (2019.01); *G06Q 50/16* (2013.01)

(58) Field of Classification Search
CPC .............................. G06Q 50/16; G06F 16/387
See application file for complete search history.

(56) References Cited

U.S. PATENT DOCUMENTS 11,687,959 B2 * 6/2023 Abdallah ........... G06Q 30/0205 705/7.34
12,386,826 B1 * 8/2025 Bao ......................... G06F 30/27
2022/0405340 A1 * 12/2022 Kirkwood ............. G06F 16/904

(Continued)

OTHER PUBLICATIONS

Yang, Shiqi, Yu Zhao, and Haoxiang Gao. "Using large language models in real estate transactions: A few-shot learning approach." OSF Preprints (2024). (Year: 2024).*

(Continued)

*Primary Examiner* — Jialong He
(74) *Attorney, Agent, or Firm* — FIG. 1 Patents

(57) ABSTRACT

Techniques are described for performing automated operations involving determining data about a user and using the user-specific data along with additional generated prompt instructions as input to a trained large language model (LLM) to cause the LLM to select a group of dwelling-related information specific to the user from a plurality of types of dwelling-related information, and presenting the selected group of dwelling-related information to the user or otherwise using the information for the user. The group of dwelling-related information may include two or more content pieces that are each specific to a particular target dwelling available for acquisition and/or occupancy, and may further include one or more additional content pieces of at least one additional type of dwelling-related information that is not specific to any particular dwelling (e.g., each related to a respective real estate service or other related functionality or information).

22 Claims, 11 Drawing Sheets

(51) Int. Cl.
*G06F 16/387* (2019.01)
*G06N 20/00* (2019.01)

(56) References Cited

U.S. PATENT DOCUMENTS

| | | | | |
|---|---|---|---|---|
| 2025/0225598 | A1* | 7/2025 | Hiatt | G06Q 50/16 |
| 2025/0232392 | A1* | 7/2025 | Fahl | G06Q 50/16 |

OTHER PUBLICATIONS

Nikhil R. Devanur et al., "Whole-Page Optimization and Submodular Welfare Maximization with Online Bidders", ACM Transactions On Economics And Computation, vol. 4, No. 3, Article 14, Apr. 2016, 20 pages.
Weicong Ding et al., "Whole-Page Optimization With Global Constraints", KDD '19 , Aug. 4-8, 2019, 9 pages.
Yue Wang et al., "Beyond Ranking: Optimizing Whole-Page Presentation", WSDM' 16, February 22-25, 2016, 10 pages.
Zhenning Zhang et al., "GenSERP: Large Language Models For Whole Page Presentation", Feb. 22, 2024, retrieved from https://arxiv.org/html/2402.14301v1 on Jun. 30, 2024, 8 pages.

* cited by examiner

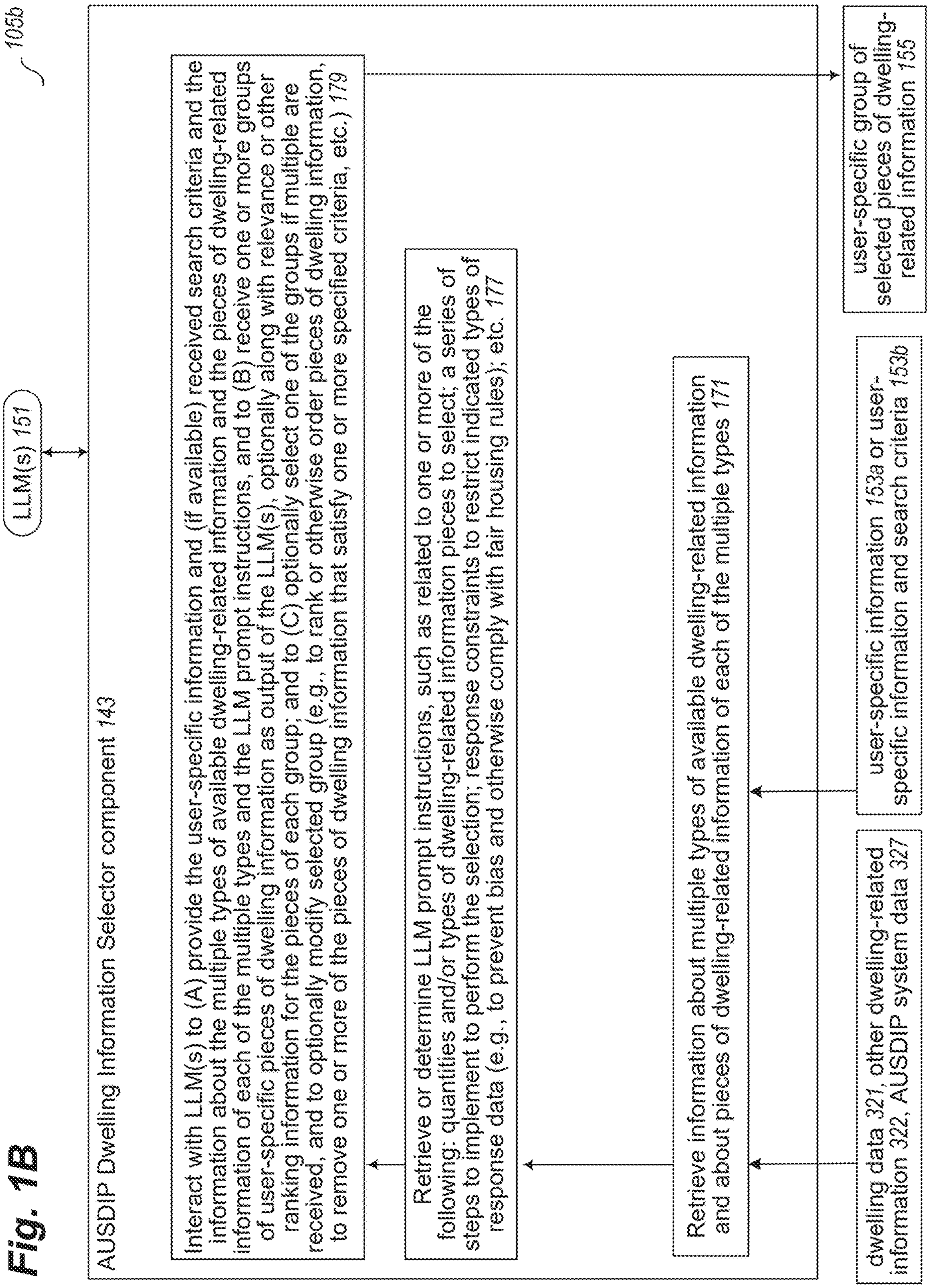
Fig. 1B
105b
LLM(s) 151
AUSDIP Dwelling Information Selector component 143
Interact with LLM(s) to (A) provide the user-specific information and (if available) received search criteria and the information about the multiple types of available dwelling-related information and the pieces of dwelling-related information of each of the multiple types and the LLM prompt instructions, and to (B) receive one or more groups of user-specific pieces of dwelling information as output of the LLM(s), optionally along with relevance or other ranking information for the pieces of each group; and to (C) optionally select one of the groups if multiple are received, and to optionally modify selected group (e.g., to rank or otherwise order pieces of dwelling information, to remove one or more of the pieces of dwelling information that satisfy one or more specified criteria, etc.) 179
Retrieve or determine LLM prompt instructions, such as related to one or more of the following: quantities and/or types of dwelling-related information pieces to select; a series of steps to implement to perform the selection; response constraints to restrict indicated types of response data (e.g., to prevent bias and otherwise comply with fair housing rules); etc. 177
Retrieve information about multiple types of available dwelling-related information and about pieces of dwelling-related information of each of the multiple types 171
user-specific group of selected pieces of dwelling-related information 155
user-specific information 153a or user-specific information and search criteria 153b
dwelling data 321, other dwelling-related information 322, AUSDIP system data 327

Fig. 2A Example Overview Information GUI

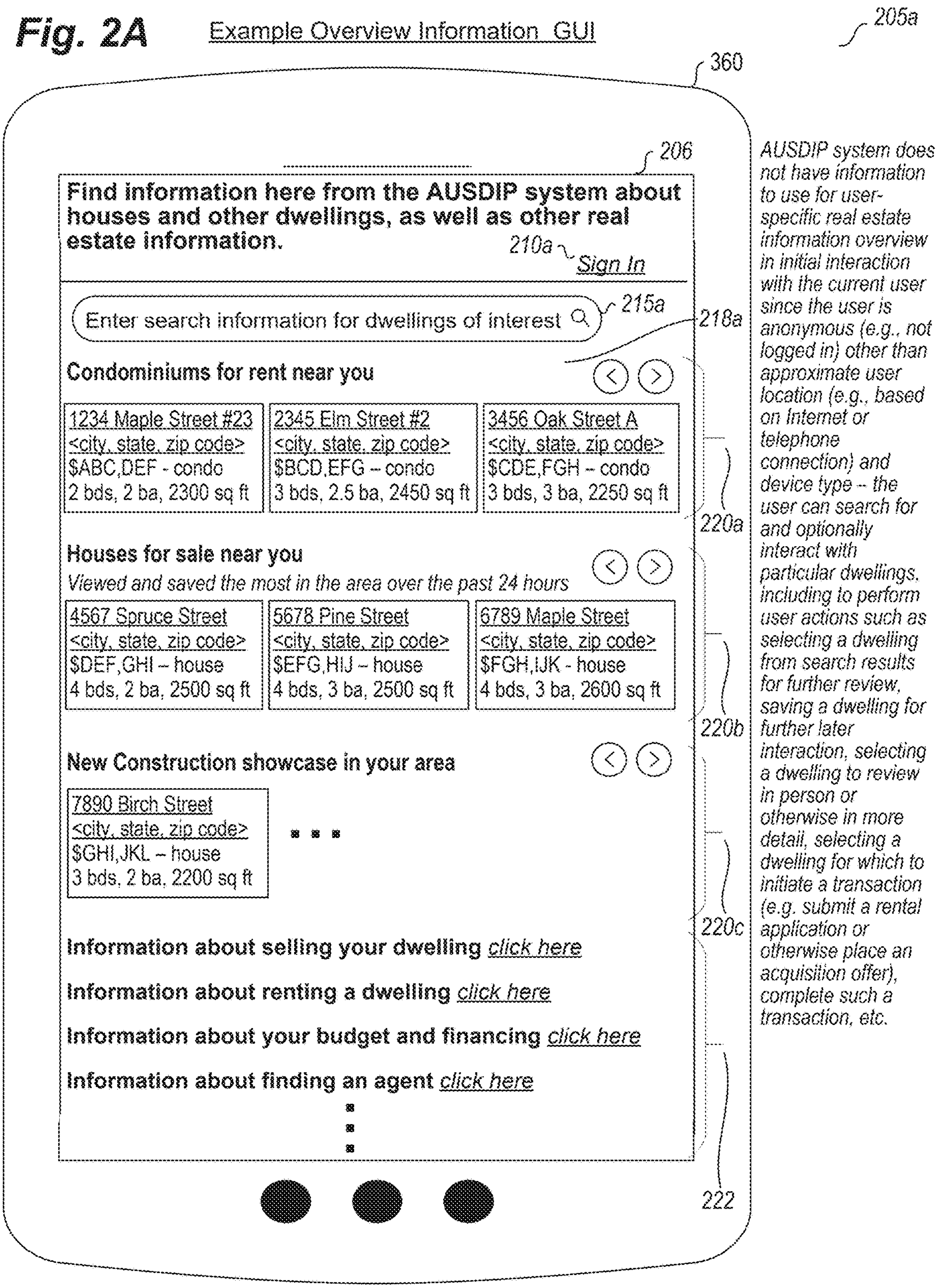

*AUSDIP system does not have information to use for user-specific real estate information overview in initial interaction with the current user since the user is anonymous (e.g., not logged in) other than approximate user location (e.g., based on Internet or telephone connection) and device type – the user can search for and optionally interact with particular dwellings, including to perform user actions such as selecting a dwelling from search results for further review, saving a dwelling for further later interaction, selecting a dwelling to review in person or otherwise in more detail, selecting a dwelling for which to initiate a transaction (e.g. submit a rental application or otherwise place an acquisition offer), complete such a transaction, etc.*

Fig. 2C Example GUI and Interactions
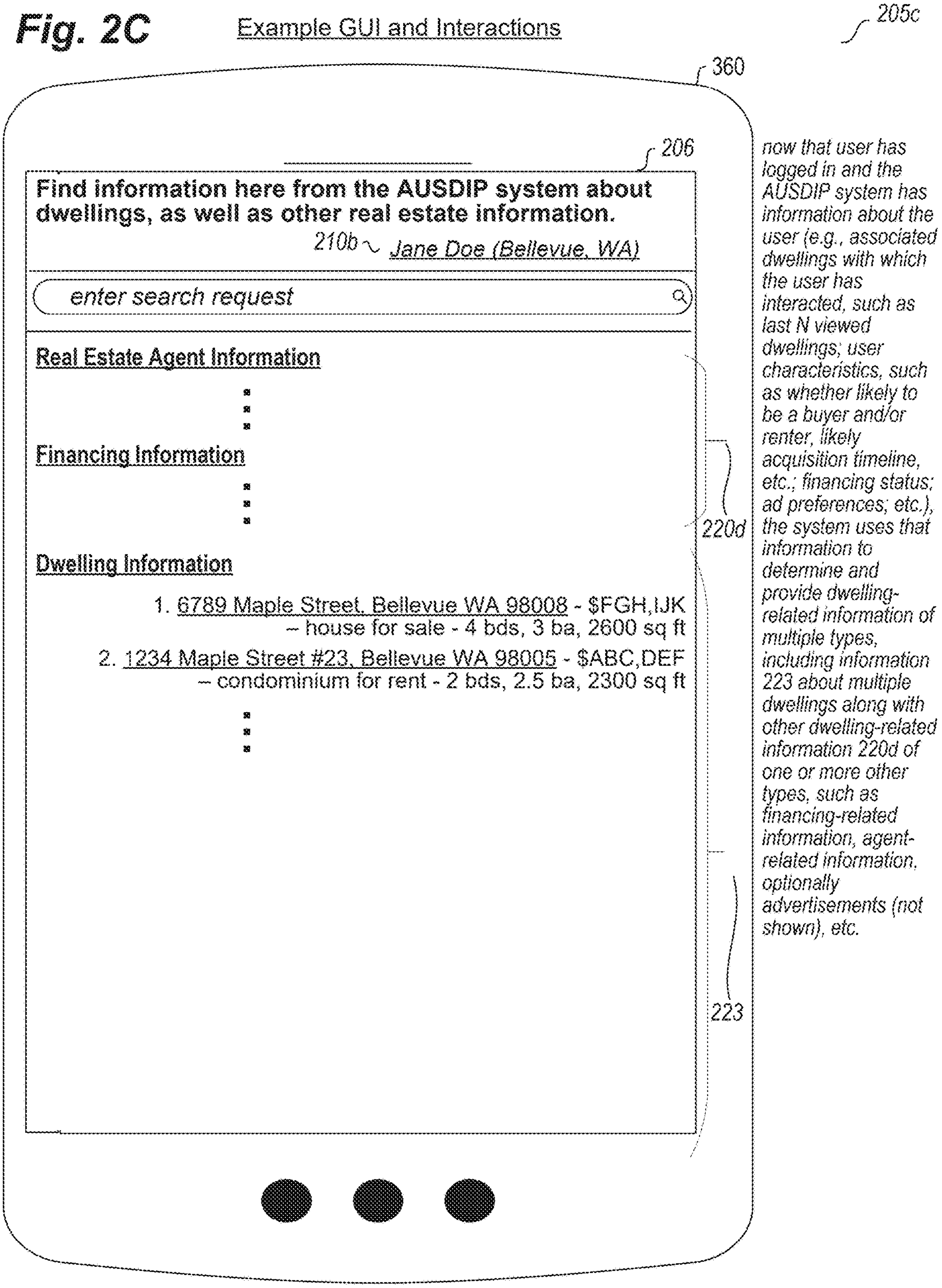

AUTOMATED TOOL FOR USING A LARGE LANGUAGE MODEL TO SELECT AND PROVIDE USER-SPECIFIC DWELLING-RELATED INFORMATION OF MULTIPLE TYPES

TECHNICAL FIELD

The following disclosure relates generally to techniques for automatically using a trained large language model to select user-specific dwelling-related information for a user, such as by selecting a group of multiple pieces of dwelling-related information specific to the user from multiple types of available dwelling-related information, and by presenting or otherwise providing the selected user-specific dwelling-related information to the user.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas (e.g., buildings of various types). In addition, various other information is available via other communication mediums. However, existing search engines and other techniques for identifying information of interest suffer from various problems. Non-exclusive examples include a difficulty in understanding natural language requests, difficulty in providing accurate information that is specific to a particular topic of interest and/or useful to a particular user, difficulty in limiting information requests to approved topics, etc.

BRIEF DESCRIPTION OF THE DRAWINGS

FIGS. 1A-1B are network diagrams illustrating an example system for performing described techniques, including automatically using a trained large language model to select user-specific dwelling-related information for a user from multiple types of available dwelling-related information.

FIGS. 2A-2E illustrate examples of performing described techniques, including automatically using a trained large language model to select user-specific dwelling-related information for a user from multiple types of available dwelling-related information.

DETAILED DESCRIPTION

Figure 1A:
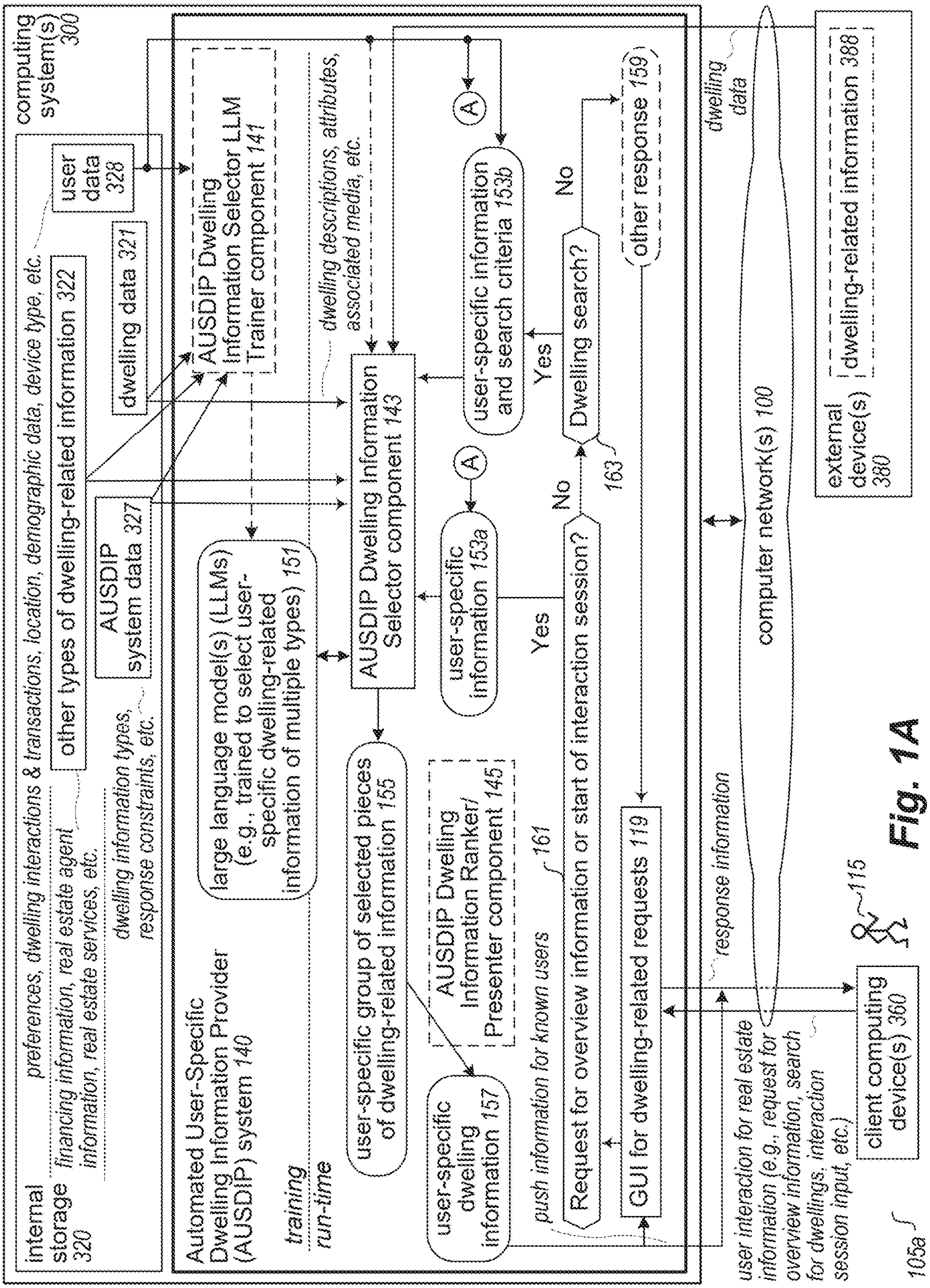

The present disclosure describes techniques for using computing devices to perform automated operations involving automatically determining data about a user and using the user data along with additional generated prompt instructions as input to a trained large language model (LLM) to cause the LLM to select dwelling-related information for the user, such as to select, from a plurality of types of dwelling-related information, a group of multiple content pieces having dwelling-related information specific to the user, and by presenting or otherwise providing the selected group of dwelling-related information to the user. In at least some embodiments, the group of multiple content pieces of dwelling-related information that are selected by the large language model (LLM) for a particular user include two or more content pieces that are each specific to a particular target dwelling (e.g., house, home, apartment, condominium, short-term rental, other building, etc.) available for acquisition and/or occupancy (e.g., purchase, rental, etc.), such as part of search results provided to the user in response to a corresponding received search request, and may further include at least one additional content piece of at least one additional type of dwelling-related information that is not specific to any particular dwelling, such as with each additional content piece being related to a respective real estate service or other related functionality or information (e.g., about identifying a real estate agent; about services associated with dwelling acquisition and/or occupation, such as real estate inspection services, repair services, etc.; about determining affordability for the user for purchase and/or renting; about obtaining a mortgage or other financing; etc.). In addition, in at least some embodiments, the content pieces that each have dwelling-related information specific to a particular target dwelling may be further separated and grouped into multiple defined types of dwelling-related information, such as to separate dwellings based on a type of availability (e.g., for purchase, for long-term rental, for short-term rental, etc.) and/or a type of dwelling category (e.g., single-family house, multi-family building, apartment, condominium, townhouses, manufactured houses, lots/land, etc.) and/or other dwelling offer characteristics (e.g., new construction, for sale by owner, furnished, coming soon, etc.). Additional details are included below regarding automatically determining data about a user and using the user-specific data and a trained LLM to select and provide dwelling-related information to the user, and some or all of the techniques described herein may, in at least some embodiments, be performed via automated operations of an Automated User-Specific Dwelling Information Provider ("AUSDIP") system, as discussed further below.

As noted above, the described techniques may include automated operations of the AUSDIP system to determine information specific to a user for use in selecting and providing building-related or other dwelling-related information to the user, with the user being, for example, a potential renter or potential purchaser or other potential acquirer/occupier that has begun a process to identify a dwelling to acquire and/or occupy. In at least some embodiments and situations, the user may be a known user (e.g., has logged in to the AUSDIP system or otherwise provided their identity), and the AUSDIP system may have a variety of types of stored information about the user, including demographic information and/or other attributes of the user, etc. In addition, the AUSDIP system may further in at least some embodiments and situations have performed a plurality of prior interactions with the user related to identifying the dwelling to acquire and/or occupy (e.g., initial searching and/or browsing, prequalifying for a mortgage or other financing or otherwise determining financial affordability information, etc.), and may use information from the prior interactions to determine and predict additional information about the user. As non-exclusive examples, the AUSDIP system may have performed multiple prior interactions with the user related to identifying a building or other dwelling of interest for the user, such as to receive and respond to various search and/or filter requests, to provide information to the user about a variety of buildings or other dwellings that are available for acquisition and/or occupancy and to receive selections by the user of particular buildings or other dwellings (e.g., to view additional details about a selected dwelling; to save a selected dwelling for later use, such as for a list of favorites; to select a particular dwelling for an in-person tour; etc.), to provide information to the user about one or more building-related or other dwelling-related services and/or other types of functionality (e.g., about identifying a real estate agent; about services associated with dwelling acquisition and/or occupation, such as real estate inspection services, repair services, etc.; about determining affordability for the user for purchase and/or renting; about obtaining a mortgage or other financing; etc.) and to receive information from interactions of the user with one or more such dwelling-related services and/or other types of functionality, etc.—in other embodiments and situations, the AUSDIP system may obtain and use information about some or all such types of user interactions without actually having participated in the interactions, such as to receive the information directly from the user and/or from an external service or site with which the user interacted. The various types of selections by the user and other user interactions may be used to, for example, determine or predict one or more additional attributes of that user (e.g., to characterize a type of dwelling of likely interest to the user, to characterize a stage of the user in the process for identifying a particular dwelling to acquire and/or occupy, to characterize a stage of the user in the process of obtaining real estate services or related functionality of a particular type, etc.), and in some situations to group that user with other users having similar selections as part of a user group or cohort. The various types of available information about a user may then be combined to generate a description of the user (e.g., known attributes, known and predicted information about the user's status and process related to identifying a dwelling to occupy and/or acquire, etc.), with that user description provided to an LLM to provide contextual data for use in selecting content pieces specific to that user. In at least some embodiments and situations, the user may not be a known user, but various types of information may nonetheless be gathered and used for the user, such as information from one or more interactions with the user during a current interaction session, a known or predicted geographical location (e.g., based on an IP address or other location information that is provided by the user and/or obtained by the AUSDIP system), a known or predicted type of client device used by the user (e.g., based on information transmitted by the device for the user and/or otherwise provided by the user), etc., and such information may similarly be used to determine a description of the user to provide to the LLM even if an identity of the user is not known. In addition, in at least some embodiments, some types of user-specific information may be excluded from use by the AUSDIP system in at least some circumstances (e.g., always excluded, excluded unless the user affirmatively opts in to having their information used, etc.), such as certain types of demographic information (e.g., sex, gender, age, religion, ethnicity, national origin, etc.) to prevent bias in the selections (e.g., to comply with fair housing rules and prevent corresponding violations). Additional details are included below regarding determining information specific to a user, for use by the LLM in selecting content pieces specific to that user.

In at least some embodiments, the described techniques include automated operations of the AUSDIP system to generate and provide information to an LLM to cause it to select user-specific content pieces for a user based at least in part on contextual data provided to the LLM—as noted above, such contextual data may include a generated description of the user, and may include various other information, such as one or more of the following non-exclusive types: from a current interaction with the user (e.g., one or more search criteria indicated by the user in a received search request or one or more other criteria indicated by the user); information about multiple defined types of available dwelling-related information (e.g., optionally filtered by the AUSDIP system for a specific user and/or a specific request, such as to select a subset of a plurality of defined types of available dwelling-related information); information about various content pieces having the defined types of available dwelling-related information that are available for selection by the LLM (e.g., optionally filtered by the AUSDIP system for a specific user and/or a specific request, such as to select a subset of a plurality of available content pieces with dwelling-related information), etc. In addition, in at least some embodiments and situations, the described techniques include generating and providing additional instructions to the LLM about how to perform the selection of a group of multiple content pieces for a user, whether in a manner specific to a particular user and/or in a general manner for any user, and with non-exclusive examples of the types of additional instructions including the following: a quantity of content pieces to select; a quantity of different types of available dwelling-related information to include in the group of selected content pieces; a procedure or other series of steps or actions to perform as part of the selection of the group of content pieces; one or more content response constraints to use in the selection, such as to prevent bias in the selections (e.g., to comply with fair housing rules and prevent corresponding violations); etc. The instructions about how to perform the content piece selection for a particular user may then be combined with the contextual data for the particular user and situation, and supplied as input to the LLM in order to cause the LLM to provide the selected group of multiple content pieces for the user as output. Additional details are included below regarding generating and providing information to the LLM to cause it to select user-specific content pieces for a user.

In at least some embodiments, the described techniques include automated operations of the AUSDIP system to provide a user with content pieces selected for the user in various manners. In at least some embodiments and situations, the AUSDIP system may generate and display a graphical user interface (GUI) via which various interactions with the user are performed, such as a GUI to enable the user to search for information about particular dwellings (e.g., to enter search requests, provide criteria to use via filters or in other manners, etc.) and to receive corresponding results, and in at least some situations by performing presentation of content pieces to a user by transmitting corresponding information over one or more computer networks to a client device of the user on which the display of the content pieces and optionally the associated GUI and its contents is performed—in at least some such embodiments, the GUI may be part of an automated chatbot provided by the AUSDIP system and used by the user (e.g., an automated chatbot powered by one or more LLMs, whether the same or different LLMs used by the AUSDIP system for the selection of the content pieces for the user). In addition, in some embodiments and situations, the AUSDIP system may at times generate and provide one or more electronic push messages to each of one or more users with content pieces selected for that user, such as via email, text message, notifications and/or alerts provided via a GUI of the AUSDIP system, etc., and optionally as prompted to do so based on a specified schedule and/or when one or more other defined criteria are satisfied. Additional details are included below regarding how to provide selected content pieces to a user, including in the examples of FIGS. 2A-2E.

In addition, in at least some embodiments, the described techniques include automated operations of the AUSDIP system to train a particular LLM model before use in selecting content pieces for particular users in a manner specific to those users. In at least some embodiments and situations, a trained general-purpose LLM may be further trained using information specific to a real estate domain, including to provide examples of interactions with particular users in particular situations and of corresponding content pieces selected for those users that have multiple defined types of dwelling-related information (e.g., selected in one or more other manners not using an LLM). In other embodiments and situations, a new LLM may be generated and trained using information specific to the real estate domain, such as in a manner similar to that noted above, while in yet other embodiments and situations, a general-purpose LLM may be used by the AUSDIP system without further training. Additional details are included below regarding how to train and otherwise use LLM models.

The described automated techniques provide various benefits in various embodiments, including to significantly improve dwelling-related information that is selected and provided to users (e.g., in response to specified queries for information about dwellings satisfying one or more specified criteria, including queries specified in a natural language format). Such automated techniques also allow such dwelling-related information to be identified much more quickly and efficiently than previously existing techniques (e.g., using less storage and/or memory and/or computing cycles) and with greater accuracy, based at least in part on using the described techniques for improving the accuracy and relevance of information provided to specific users in specific situations, etc. In addition, in some embodiments the described techniques may be used to provide an improved GUI (graphical user interface) in which a user may more accurately and quickly obtain real estate-related information, including in response to an explicit request (e.g., in the form of a natural language query), as part of providing personalized information to the user, etc. Various other benefits are also provided by the described techniques, some of which are further described elsewhere herein.

As noted above, the automated operations of the AUSDIP system in at least some embodiments include automatically selecting content pieces with various types of dwelling-related information and providing the content pieces to a user. A content piece specific to a particular dwelling may have various forms in various embodiments, such as when part of a list of multiple dwellings (e.g., with each dwelling have an associated content piece with only a small amount of information about the dwelling, such as an address, a status of whether the dwelling is available for a particular type of acquisition and/or occupancy, basic dwelling attributes such as a quantity of bedrooms and/or a quantity of bathrooms and/or a listing price, etc.), and if so may be or have an associated user-selectable control or link that the user may select to obtain additional information. Such additional information for a particular target dwelling may include a dwelling occupancy description having various types of information about the target dwelling, with non-exclusive examples including one or more of the following: an overview textual description of a dwelling, such as with one or more sentences providing overview information about aspects of the dwelling, and/or of an associated property on which the dwelling is located, and/or of an associated neighborhood or area around the dwelling; a variety of dwelling attributes, optionally each including one or more values (e.g., attribute-value pairs), such as to each describe a feature of the dwelling and/or of occupancy rules associated with the dwelling; one or more images and/or videos and/or other media items with visual and/or audio content about the dwelling (e.g., one or more images with visual data of an interior of the dwelling; one or more images with visual data of an exterior of the dwelling, such as a street-level-view image of the front of the dwelling, an overhead image of some or all of the dwelling and optionally some or all of a surrounding property, etc.; one or more video clips with visual data and optionally accompanying audio data; one or more audio clips with audio data for the dwelling, such as audio captured at the dwelling and/or with content describing the dwelling; a two-dimensional, or 2D, floor plan of the dwelling; a three-dimensional, or 3D, computer model floor plan of the dwelling; a virtual tour of inter-linked images through which a viewer may progress in a user-selected and/or automated manner; etc.); user-generated content for the dwelling, such as user reviews and comments; etc. The dwelling attributes included in a dwelling occupancy description for a dwelling may be of various types in various embodiments, such as any quantifiable information about the dwelling, with non-exclusive examples including the following: quantity of bedrooms, quantity of bathrooms, square footage of the dwelling, square footage of the property on which the dwelling is located, quantity of garage spaces, quantity of parking spaces, school district, HOA fees, listing price, purchase price, price per dwelling square foot, pool or not, water view or not, pets allowed or not, etc., including information that is included in an MLS (multiple listing service) listing, as well as additional information that is derivable from other quantifiable information (e.g., distance to one or more specified types of services or amenities, such as a hospital, grocery store, park, etc.; estimated total monthly payments to finance a purchase with a specified down payment, such as to include a mortgage for the listing or purchase price along with estimates of other fees such as taxes, insurance, HOA fees, etc.; estimated total monthly payments to rent, such as to include estimates of other fees such as utilities and insurance; etc.). In other embodiments and situations, the AUSDIP system may select and provide multiple content pieces for a particular dwelling to a particular user (e.g., multiple content pieces each specific to one of the types of information discussed above with respect to a dwelling's occupancy description), such as in combination with one or more other content pieces for each of one or more other dwellings and/or one or more other additional content pieces that are not specific to that dwelling or to any other particular dwelling (e.g., to instead be of one or more other types of dwelling-related information related to real estate services and/or functionality that are available, optionally including one or more advertisements for one or more such services and/or functionality types).

In at least some embodiments, some or all user requests and other queries may be entered using multiple free-form natural language terms (e.g., to specify one or more search criteria), and if so the AUSDIP system may analyze such a query to determine the user-specified criteria and/or other information to use, including by segmenting the terms in the received query into one or more segments each corresponding to an indicated search criterion. Such segmenting of the sequence of term(s) may be performed in various manners in various embodiments, such as by identifying matches in one or more dictionaries (e.g., general-purpose dictionaries, dictionaries of POI location names, dictionaries of geographical area names, etc.) or other lists of word/phrase breaks, by considering each combination of singleton terms and two or more adjacent terms to determine if they match POI locations or geographical areas (e.g., for a sequence of terms such as "Space Needle Seattle", considering alternative name-based designations of "Space", "Needle", "Seattle", "Space Needle", "Needle Seattle", and "Space Needle Seattle", and concluding that "Space" is grouped with "Needle" to identify a POI location name, leaving the name-based designation of "Seattle" to identify a surrounding geographical area that together uniquely identify the POI location, such as to differentiate the Space Needle in Seattle from other space needles in other geographical areas), etc. In some embodiments, each combination of terms is treated as a separate segment (e.g., for a sequence of terms such as "Stamford New York", using all of "Stamford", "New", "York", "Stamford New", "New York" and "Stamford New York" as separate segments), or search queries may be parsed without using such segments. In addition, in some embodiments and situations, the received query may include one or more segments for one or more search criteria of one or more specific types, such as one or more of the following: dwelling-type category designations (e.g., 'apartment', 'single family house', 'condominium', etc.); POI categories (e.g., "beaches", "parks", "schools", "hospitals", "lakes", etc.); indeterminate distance indications that are associated with one or more POI locations and/or POI categories (e.g., "nearby" or analogous terms such as "near", "by", "around", "at", "close to", "adjacent", etc.; a travel-based distance measure with an indicated travel type, such as walking or bicycling or scootering or driving or bus or train or light rail or mass transit; etc., and an associated amount of travel time that is specified or otherwise determined); non-location-related search filters or other search criteria, such as search criteria related to dwelling attributes (e.g., minimum and/or maximum and/or target price, number of bathrooms, number of bedrooms, etc.), etc. In some embodiments and situations, a received query may include only an indication of a POI location or a POI category, and other search criteria such as geographical area and/or dwelling type and/or indeterminate distance and/or other dwelling-related attributes may be automatically determined for use with the search query (e.g., inferred, selected as a default, etc.), optionally based on information specific to a user who submitted the search query and/or a current context (e.g., as part of an ongoing search interaction session by using previously specified details). Additional details are included herein related to analyzing a sequence of one or more terms of a received query that is specified using free-form natural language.

FIGS. 1A-1B are network diagrams illustrating an example system for performing described techniques, including automatically determining and using data about a user to select and provide dwelling-related information to the user.

In particular, FIG. 1A illustrates information 105*a* about an example embodiment of an AUSDIP system 140 executing on one or more computing systems 300, and interacting over one or more computer networks 100 with one or more client computing devices 360, such as to receive query requests and other interactions from users 115 of the client computing devices for various types of dwelling-related information and to provide corresponding responses (e.g., as part of search results about particular dwellings, optionally along with one or more other types of dwelling-related information that is not specific to particular dwellings), whether as pull information in response to corresponding requests from the users and/or as push messages sent that are not in response to explicit corresponding requests. In the illustrated embodiment, the computing systems 300 may store various information on storage 320 that is used by the AUSDIP system during operation (e.g., in one or more databases, not shown), including dwelling data 321 about dwellings in one or more geographical areas (e.g., in one or more countries, states, cities, etc.), other types of dwelling-related information 322 (e.g., related to real estate services and/or associated functionality and information of one or more types, such as related to real estate agents, mortgages and other financing, affordability calculators and other tools, etc.), user data 328 (e.g., user location; prior user interaction data for interactions of one or more types via the AUSDIP system, and optionally additional received interaction data for further interactions of the user outside the AUSDIP system with one or more dwellings, including in-person interactions and transactions to acquire and/or occupy particular dwellings; user preferences, such as expressly specified and/or implicitly determined from past activities of the user such as viewing or otherwise interacting with information about dwellings; information about user location and/or device type, whether provided and/or automatically inferred or otherwise determined; etc.), and AUSDIP system data 327 (e.g., about defined types of dwelling-related information; content response constraints and other types of LLM content selection instructions; geographic regions; names and locations of POI locations and associated POI categories; data for use in determining distances of one or more types between two or more geographical locations; information for use in segment determination such as word-break and/or phrase-break vocabularies; etc.). The AUSDIP system may further optionally retrieve and use other dwelling-related information and/or user interaction information 388 of one or more types stored externally to the computing systems 300, such as accessed over the one or more computer networks 100 from one or more external computing and/or storage devices 380, whether in addition to or instead of information stored on storage 320, and optionally including information about user interactions outside of the AUSDIP system with dwellings and about additional dwelling-related data.

As one example of operations of the AUSDIP system 140, an AUSDIP Dwelling Information Selector LLM Trainer component 141 optionally performs activities to generate and/or train one or more large language models (LLMs) 151 (e.g., transformer-based neural network models) for use in selecting user-specific groups of content pieces from available content pieces with a plurality of defined types of dwelling-related information, including to obtain, as input, dwelling data 321 about dwellings (including dwelling occupancy descriptions of the dwellings with dwelling attributes and other information about the dwellings), other types of dwelling-related information 322 (e.g., information about accessing particular real estate services and functionality, optionally including corresponding advertisements), user data 328 (including information about user preferences, prior user dwelling interactions, user location, etc.), and one or more types of AUSDIP system data (e.g., information about defined types of dwelling-related information, etc.). Additional details are included elsewhere herein related to the generation and training of the one or more LLMs 151. In other embodiments and situations, the AUSDIP system 140 may instead obtain and use one or more LLMs that are already trained, whether general-purpose LLMs or LLMs that are trained at least in part in a manner specific to use with real estate information.

After the one or more LLMs 151 are available for use, the example operations may further include a particular user 115 of one of the client computing devices 360 supplying a request for one or more types of dwelling-related information (e.g., for information about one or more dwellings that are available for occupancy and/or acquisition, such as a search request for dwellings satisfying one or more specified search criteria) to GUI 119 provided by the AUSDIP system (e.g., in a natural language free-form input) or other request to GUI 119 provided by the AUSDIP system (e.g., for a home page or other overview information, a chatbot interaction request, etc.). The operational flow then proceeds to block 161 to determine if the received query is a request for overview information or otherwise is the start of an interaction session, and if so continues to retrieve or otherwise determine user-specific information 153*a* for the user (e.g., based on prior interactions with the user, based on stored information for a known user, etc.), such as from user data 328, and otherwise continues to block 163 to determine if the received query is a request for dwelling information (e.g., a dwelling search). If it is determined in block 163 that the received query is a request for dwelling information, the operational flow continues to retrieve or otherwise determine user-specific information 153*b* for the user combined with any search criteria specified by the user, and otherwise continues to optionally generate another type of response 159 to be provided to the user via the GUI 119.

If it is determined in blocks 161 or 163 that the request was for overview information or otherwise for the start of an interaction session, or is a search for dwellings, the operational flow continues to the AUSDIP Dwelling Information Selector component 143, which receives the user-specific information 153*a* or the user-specific information combined with the search criteria 153*b* for use as contextual data, further obtains information from dwelling data 321 and other dwelling-related information 322 about available content pieces specific to particular dwellings and/or obtains information from the system data 327 about LLM prompt instructions to use and/or optionally obtains further user-specific data from user data 328, uses the obtained information to generate contextual data and prompt instructions for the LLM(s), and supplies the generated contextual data and instructions to the LLM(s) 151 in order to obtain LLM output that includes a user-specific group of selected content pieces with dwelling-related information 155-FIG. 1B provides additional details regarding operations of the component 143 in one example embodiment. The information 155 is then used to produce user-specific dwelling information 157 to be provided to the user, optionally with the information 155 modified in one or more manners by the optional AUSDIP Dwelling Information Ranker/Presenter component 145 to produce the information 157, such as to rank the information 155 in one or more manners if the information 155 output from the LLM(s) is not already ranked and/or to filter the information in one or more manners (e.g., based on preferences and/or constraints that were not included in the generated instructions for the LLM(s), such as to further apply user preferences for the user, to format the information for presentation, to apply business rules related to types of dwelling-related information to be included and/or related to how to combine different types of dwelling-related information, etc.)—in other embodiments and situations, the LLM(s) suggests or provides ranking information for the information 155, such as in accordance with the instructions generated for the LLM(s), and if so that information 155 with suggested or provided rankings may be used for the information 157, optionally without modification. The information 157 is then provided to the user, whether as a response via the GUI 119 to a corresponding request received from the user (e.g., by displaying corresponding information to the authorized user in the GUI), or instead in some embodiments and situations as push information that is not in response to a specific request from the user and that is sent to the client device 360 of the user via one or more electronic messages for access separate from the GUI 119 (e.g., if the component 143 instead interacts with the LLM(s) 151 to generate corresponding push messages for one or more users at particular times or otherwise when defined criteria are satisfied).

The same user may then provide one or more subsequent queries to the GUI 119 as part of an ongoing interaction session, such as with similar processing performed for the subsequent user queries, and optionally with the context of prior interactions during the session being maintained and used by the AUSDIP system. In addition, a user may in some embodiments and situations provide optional user feedback, such as to provide feedback regarding accuracy of response information or to provide further clarifying information in response to a corresponding request or to specify further user preferences to be used, etc.—if so, such optional user feedback may be forwarded to the components 143 and/or 145 or otherwise used by the AUSDIP system, such as to improve future operations performed by the components. In other embodiments and situations, some or all such feedback may instead be implicit feedback that is determined based on an analysis of subsequent user queries (e.g., to indicate that a prior query response did not provide information that the user was seeking) and/or of prior user queries (e.g., to determine user preferences and/or user location, such as based on patterns in the prior user queries). While the example discussed above involves a single user performing multiple interactions with the AUSDIP system as part of an interaction session (e.g., spanning seconds, minutes, hours, days, etc.), it will be appreciated that the AUSDIP system may in at least some embodiments and situations be concurrently interacting with many users using different client computing devices, such as to maintain a separate GUI and interaction session history for each such user, and that a new interaction session may be initiated for a user after one or more prior interaction sessions with that user in various manners (e.g., based on a corresponding user instruction, such as to reflect a change in the types of dwelling information of interest; as determined automatically by the AUSDIP system, such as to reflect a change in the types of dwelling information being requested, or due to a defined period of time since a last user interaction being exceeded, such as one or more days; etc.).

Figure 3:
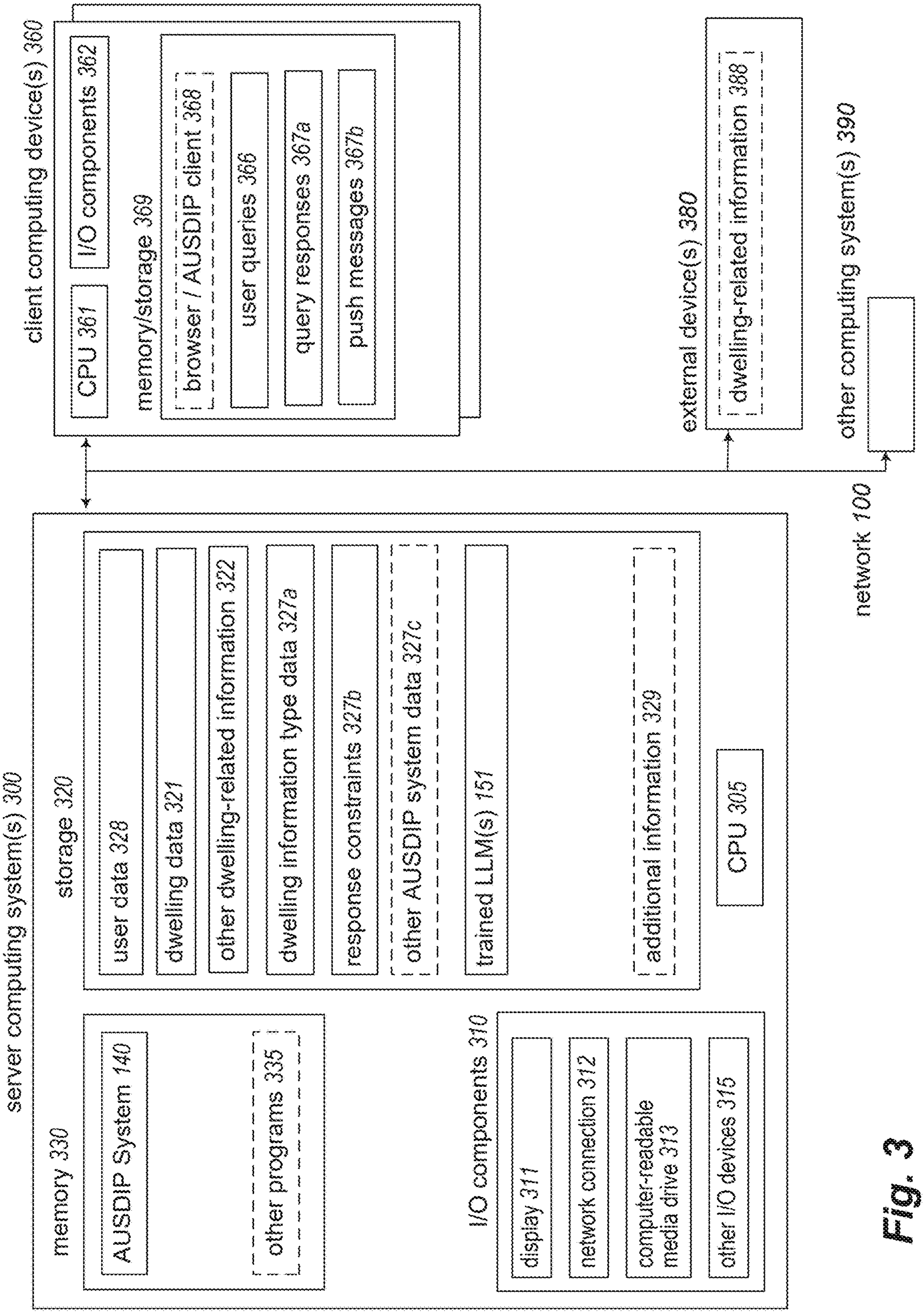
FIG. 3 is a block diagram illustrating an example of a computing system for use in performing described techniques, including automatically using a trained large language model to select user-specific dwelling-related information for a user from multiple types of available dwelling-related information.

In addition, the computing system(s) 300 may include various other components and functionality, as discussed in greater detail elsewhere herein, including with respect to FIG. 3. The computer networks 100 may similarly be of various types in various embodiments and may include various types of wired and/or wireless segments, including one or more publicly accessible linked networks (e.g., operated by various distinct parties, such as the Internet)

and/or a private network (e.g., a corporate or university network that is wholly or partially inaccessible to non-privileged users), including in some cases to have both private and public networks (e.g., with one or more of the private networks having access to and/or from one or more of the public networks).

FIG. 1B continues the example of FIG. 1A, and illustrates information 105*b* for one example embodiment of the AUSDIP Dwelling Information Selector component 143 discussed in FIG. 1A. In particular, in the illustrated embodiment, the component 143 performs various activities to use the one or more LLMs 151 to generate a user-specific group of selected content pieces with dwelling-related information 155 for a particular user, such as by generating contextual data for current activities of the user and other prompt instructions that are supplied to the LLM(s) to cause the LLM(s) to select the user-specific group of selected content pieces with dwelling-related information 155 from a plurality of content pieces having a plurality of defined types of dwelling-related information.

In operation, the component 143 receives, as input, dwelling data 321 about available content pieces for various dwellings in one or more geographical regions that are available for occupancy and/or acquisition (e.g., dwelling occupancy descriptions for the dwellings) and other dwelling-related information 322 about available content pieces specific to particular dwellings, information from the system data 327 about LLM prompt instructions to use, user-specific information 153*a* or user-specific information combined with search criteria 153*b* for use as contextual data, and optionally other user-specific data. In block 171, the component 143 then retrieves or otherwise determines information about multiple types of available dwelling-related information and about available pieces of dwelling-related information of each of the multiple types, such as from dwelling data 321 and other dwelling-related information 322. In block 177, the component then retrieves or determines LLM prompt instructions to supply to the one or more LLMs, such as related to one or more of the following: quantities and/or types of dwelling-related information content pieces to select; a series of steps or actions to implement to perform the selection; content response constraints to restrict indicated types of response data, such as to prevent bias and/or to otherwise comply with fair housing rules; etc.—in some embodiments and situations, the same LLM prompt instructions are used for multiple different LLM interactions for different users but with different contextual data for each user and/or interaction, while in other embodiments the LLM prompt instructions may be determined in a manner specific to a particular user. In block 179, the component then interacts with the one or more LLM's to (A) provide instructions input that includes the contextual data (including the user-specific information and, if available, received search criteria), and the information about the multiple types of available dwelling-related information and the content pieces of dwelling-related information of each of the multiple types for use in the selection (e.g., all defined types of available dwelling-related information and/or all available content pieces of dwelling-related information, or optionally with one or both filtered by the component 143 for the current interaction based on one or more criteria being satisfied), and the generated LLM prompt, and to (B) receive one or more groups of user-specific content pieces of dwelling information as output of the LLM(s), optionally along with relevance or other ranking information for the pieces of each group; and to (C) optionally select one of the groups if multiple are received, and to optionally modify the selected group (e.g., to rank or otherwise order pieces of dwelling information, to remove one or more of the pieces of dwelling information that satisfy one or more specified criteria, etc.). The resulting selected group of content pieces, optionally as modified in block 179, are then output from the component as the user-specific group of selected content pieces with dwelling-related information 155 for a particular user.

It will be appreciated that various details are provided with respect to FIGS. 1A-1B for illustrative purposes, and are not intended to limit the scope of the invention unless otherwise indicated. Similarly, additional exemplary details are provided with respect to FIGS. 2A-2E and elsewhere herein, and such details are similarly provided for illustrative purposes and are not intended to limit the scope of the invention unless otherwise indicated.

FIGS. 2A-2E illustrate examples of performing described techniques, including automatically determining and using data about a user to select and provide dwelling-related information to the user.

In particular, FIG. 2A illustrates information 205*a* including an example client computing device 360 (in this example, a smartphone) that is being used by a user (not shown) to interact with a GUI provided by the AUSDIP system, with current information 206 displayed in the GUI. In this example, the current information 206 corresponds to overview dwelling-related information provided in response to a previous request (e.g., a request to load a home page of a corresponding Web site), with the displayed information including a search box 215*a*, a user-selectable control 210*a* via which the user may sign in, and various groups of information 220 and 222 related to multiple types of dwelling-related information. In this example, the user has not yet signed in, and is thus unknown, and has not performed any prior interactions during a current interaction session (since the session just begun, although in other embodiments and situations prior interactions with the same unknown user on the same client device in one or more previous interaction sessions may be retrieved and used)—accordingly, in this example, the AUSDIP system has only limited information about the user (in this example, approximate user location and a determined device type of the device 360), and the dwelling-related information of multiple defined types that has been selected for the user by the AUSDIP system's use of an LLM (not shown) reflects that limited contextual data for the user. In particular, in this example, the displayed information includes a first group of information 220*a* to show multiple content pieces of a first defined type about specific example condominiums for rent near the user's location 218*a* (e.g., based on an automatically determined location of the user or the user's client device), which in this example includes three content pieces for three example condominiums that are each a user-selectable control to obtain additional information about the corresponding condominium when selected, along with additional user-selectable controls to view additional condominiums of that type-information about other types of dwellings (e.g., apartments, houses, etc.) may be provided in other situations, whether in addition to or instead of condominiums. The example provided information further includes a second group of information 220*b* to show multiple content pieces of a second defined type about specific example houses for sale near the user's location, which in this example includes three additional content pieces for three example existing-construction houses that are each a user-selectable control to obtain additional information about the corresponding house when selected, along with additional corresponding user-selectable controls to view additional houses of that type—in a similar manner to information 220*a*, information about other types of dwellings may be provided in other situations, whether in addition to or instead of existing-construction houses. The example provided information also includes a third group of information 220*c* to show one or more content pieces of a third defined type about specific example new construction houses for sale in the user's geographical area (e.g., city, county, etc.), which in this example includes at least one additional content piece for at least one such new construction home in the geographical area of the user that is each a user-selectable control to obtain additional information about the corresponding new construction house when selected, along with additional corresponding user-selectable controls to view additional new construction houses of that type—in a similar manner to that of information 220*a* and 220*b*, information about other types of dwellings may be provided in other situations, whether in addition to or instead of new construction houses. While the example content pieces of the first, second and third types specific to particular dwellings include only limited textual information about the associated respective dwelling in this example, it will be appreciated that one or more other content pieces for a particular dwelling may be selected and displayed in other embodiments and situations, as discussed in greater detail elsewhere herein. The example provided information further includes additional information 222 of multiple additional defined types related to other dwelling-related information that is not specific to any particular dwellings, including another content piece in this example of a fourth type that includes a user-selectable control to obtain further general information about selling dwellings, another content piece of a fifth type that includes a user-selectable control to obtain further general information about renting dwellings, another content piece of a sixth type that includes a user-selectable control to obtain further information about the user's budget and financing, another content piece of a seventh type that includes a user-selectable control to obtain further general information about finding a real estate agent, etc.

Figure 2B:
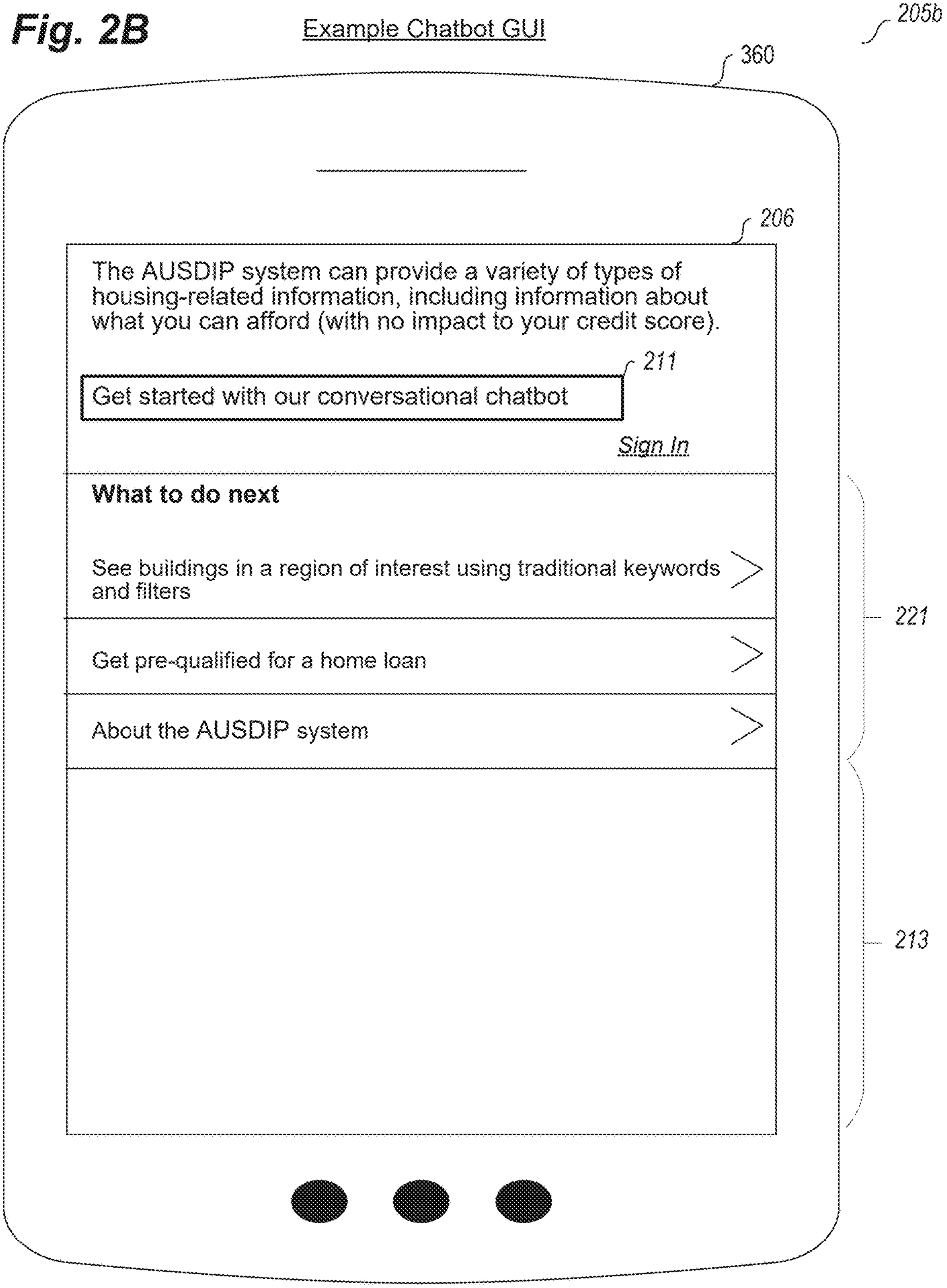

FIG. 2B continues the example of FIG. 2A, and illustrates information 205*b* that provides an example of an alternative GUI that may be used by the AUSDIP system in other embodiments, such as instead of or in addition to the example GUI of FIG. 2A, and which in this example is an automated interactive chatbot interface via which the user may enter information in a chatbot input box 211, with a history of such inputs and corresponding responses for the current interaction session being shown in an area 213 of the interface-since the chat interaction session has not yet begun, the area 213 of the interface is currently blank. In a manner similar to that of FIG. 2A, the user has not yet signed in, and thus the initial overview information provided in the chatbot GUI includes only limited information specific to the user, which in this example includes three types of defined dwelling-related information that is not specific to any particular dwellings. In particular, information 221 is shown that includes a content piece of a eighth type that includes a user-selectable control to obtain further information about search GUI functionality using keywords and filters, a content piece of a ninth type that includes a user-selectable control to obtain further information about obtaining mortgage financing, and a content piece of a tenth type that includes a user-selectable control to obtain further information about interacting with the AUSDIP system.

FIG. 2C continues the examples of FIGS. 2A-2B, and illustrates information 205*c* showing a continuation of the GUI information shown in FIG. 2A, but with additional examples of user-specific information for a particular user that is provided by the AUSDIP system after the user has signed in 210*b* and is a known user, which in this example includes information from previous interactions (not shown) with that user—as discussed in greater detail elsewhere herein, the user data from previous interactions that may be used as contextual data for input to the LLM includes non-exclusive examples as follows: the last N viewed dwellings, inferred or otherwise determined user characteristics such as whether the user is likely to be a buyer and/or a renter, an inferred or otherwise determined likely timeline in which that user will complete an acquisition of a dwelling to be identified, a financing status of the user, a preference of the user for whether to receive advertisements and/or for types of advertisements to receive, etc. In this example, the displayed information in the GUI includes multiple types of defined dwelling-related information that is not specific to particular dwellings in an area 220*d*, including information about available real estate agents and about available financing information, but with particular content pieces not illustrated in this example. In addition, the GUI further includes an area 223 showing multiple content pieces of multiple additional types of dwelling-related information, which in this example are part of overview information provided in a list format that are not in response to a particular user request and include intermixed content pieces specific to dwellings of multiple types (e.g., houses for sale, condominiums for rent, etc.).

Figure 2D:
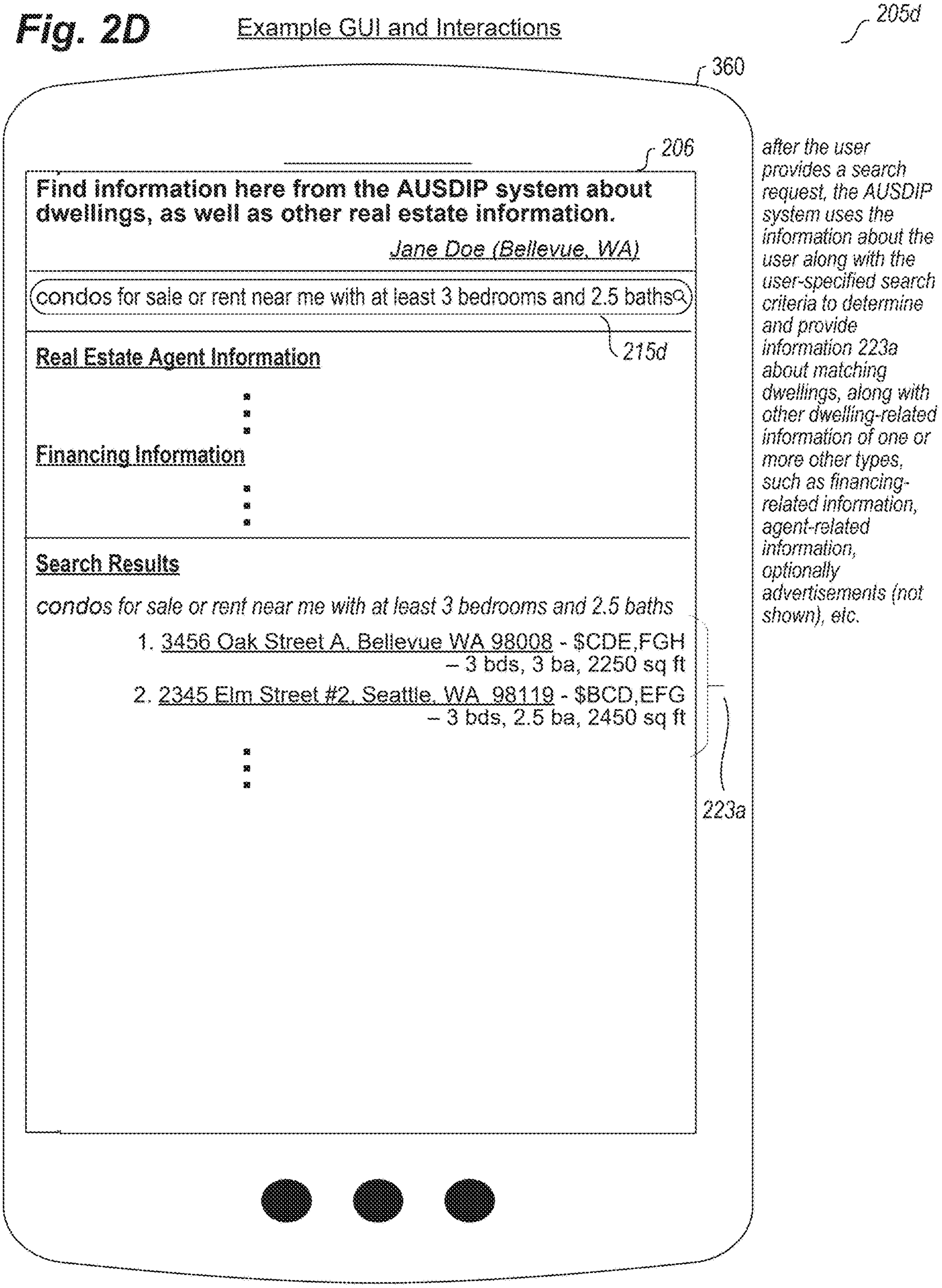

FIG. 2D continues the examples of FIGS. 2A-2C, and illustrates information 205*d* showing a continuation of the GUI information shown in FIG. 2C, but in which the user has entered a search request in the search box 215*d*, which in this example is a natural language free-form request for "condos for sale or rent near me with at least 3 bedrooms and 2.5 baths", and with the information 223*a* in the GUI being updated in this example to include search results that are selected by the AUSDIP system using an LLM (not shown) based in part on the specified search criteria along with additional user-specific contextual data. In particular, in this example, the additional content pieces are of one or more types of dwelling-related information specific to a single particular dwelling-type category ("condominiums") and to multiple types of dwelling availability categories ("for sale", "for rent", etc.), with at least two example content pieces shown.

Figure 2E:
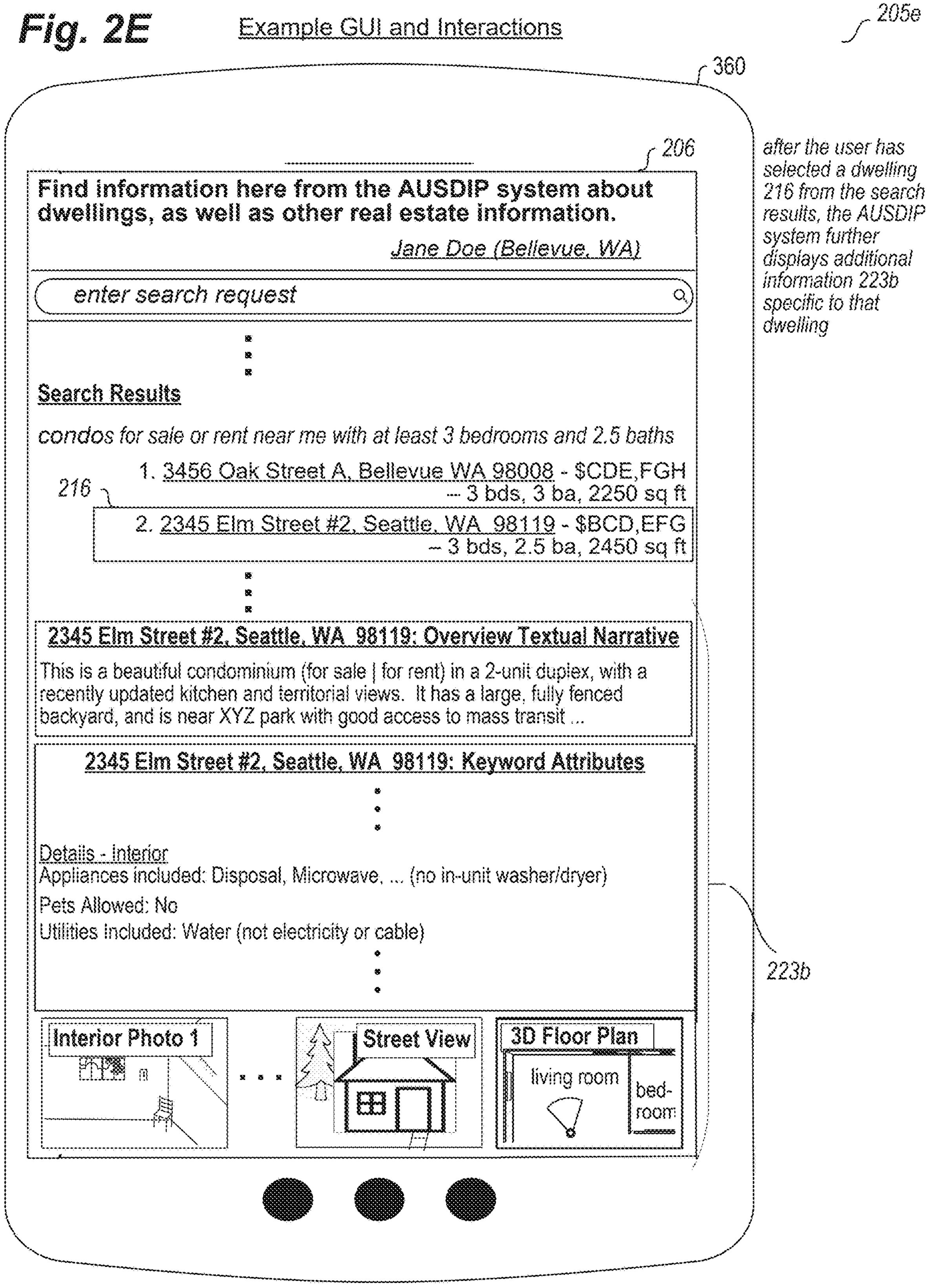

FIG. 2E continues the examples of FIGS. 2A-2D, and illustrates information 205*e* showing a continuation of the GUI information shown in FIG. 2D, but in which the user has selected 216 one of the dwelling-specific content pieces (in this example, has selected the user-selectable control represented by the second content piece in the list), and in which the AUSDIP system has further used the LLM (not shown) to, using the available user-specific data as contextual data, select and present multiple additional content pieces associated with the respective dwelling for the selected content piece. In this example, the additional content pieces 223*b* shown include textual data for the dwelling of a first type corresponding to an overview textual narrative, textual data for the dwelling of a second type corresponding to keyword attributes, image data of a third type corresponding to an interior photo of the dwelling, image data of a fourth type corresponding to an exterior street view image of the dwelling, media data of a fifth type corresponding to a 3D (three dimensional) floor plan for the dwelling, etc. It will be appreciated that other types of content pieces for a particular dwelling may be shown, that particular content pieces may be shown in other manners, and that one or more of the illustrated types of content pieces may be displayed at other times, including in initial search results or other groups of dwelling-specific information.

It will be appreciated that the examples of FIGS. 2A-2E are provided for illustrative reasons only, and are not intended to limit the scope of the invention. For example, a variety of other combinations of natural language free-form search terms may be used in other embodiments and situations.

In addition, further details related to at least some operations of the AUSDIP system and its components are included in U.S. Non-Provisional patent application Ser. No. 18/583,602, filed Feb. 21, 2024 and entitled "Automated Tool For Determining And Providing Building Information For Multiple Partially Described Proximate Geographical Regions"; in U.S. Non-Provisional patent application Ser. No. 18/642,246, filed Apr. 22, 2024 and entitled "Automated Tool For Determining And Using User-Specific Predicted Attributes Of Dwellings That Users Will Later Occupy"; in U.S. Non-Provisional patent application Ser. No. 18/628,765, filed Apr. 7, 2024 and entitled "Automated Tool For Generating And Providing Housing-Related Information"; in U.S. Non-Provisional patent application Ser. No. 18/622,829, filed Mar. 29, 2024 and entitled "Automated Tool For Determining And Providing Information About Dwellings Within Geographical Regions That Are Determined Specific To Indicated Locations"; in U.S. Non-Provisional patent application Ser. No. 18/734,815, filed Jun. 5, 2024 and entitled "Automated Tool For Determining And Providing Information About Dwellings Satisfying Search Criteria Specified Using Multiple Data Modes"; and in U.S. Non-Provisional patent application Ser. No. 18/632,217, filed Apr. 10, 2024 and entitled "Automated Tool For Determining And Providing Information About Dwellings Using Heterogenous Search Strategies"; each of which is incorporated herein by reference in its entirety.

For illustrative purposes, some embodiments are described herein in which specific types of information are acquired, used and/or presented in specific ways using specific types of data structures and by using specific types of devices-however, it will be understood that the described techniques may be used in other manners in other embodiments, and that the invention is not limited to exemplary details provided. As one non-exclusive example, specific types of data structures and algorithms are generated and/or used in specific manners in some embodiments, but it will be appreciated that other types of information may be generated and used in other manners in other embodiments, including for types of information other than dwelling information and using a selection mechanism other than an LLM. Similarly, while particular user interface display and interaction techniques are shown, other user interaction techniques may be used in other embodiments. In addition, various details are provided in the drawings and text for exemplary purposes, but are not intended to limit the scope of the invention—for example, sizes and relative positions of elements in the drawings are not necessarily drawn to scale, with some details omitted and/or provided with greater prominence (e.g., via size and positioning) to enhance legibility and/or clarity, and identical reference numbers may be used in the drawings to identify the same or similar elements or acts.

FIG. 3 is a block diagram illustrating an embodiment of one or more server computing systems 300 executing an implementation of an AUSDIP system 140, such as in a manner similar to that of FIGS. 1A-1B and 2A-2E and with additional hardware details illustrated—the server computing system(s) and AUSDIP system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing AUSDIP system 140 may communicate with other computing systems and devices via one or more networks 100 (e.g., the Internet, one or more cellular telephone networks, etc.), such as user client computing devices 360 (e.g., used to supply queries; receive responsive answers; and use the received answer information, such as to display or otherwise present answer information to users of the client computing devices and/or to implement further automated activities, such as to access other functionality provided by the AUSDIP system), optionally other external devices 380 (e.g., used to store and provide dwelling-related and/or user-action-related information of one or more types), and optionally other computing systems 390.

In the illustrated embodiment, an embodiment of the AUSDIP system 140 executes in memory 330 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the AUSDIP system may include one or more components, not shown, to each perform portions of the functionality of the AUSDIP system, and the memory may further optionally execute one or more other programs 335. The AUSDIP system 140 may further, during its operation, store and/or retrieve various types of data on storage 320 (e.g., in one or more databases or other data structures), such as various types of user data 328, dwelling data 321 (e.g., dwelling occupancy descriptions, dwelling attributes and associated values, etc.), other types of dwelling-related information 322 (e.g., related to real estate services and/or functionality and/or information that is not specific to particular dwellings), data 327*a* about a plurality of defined types of dwelling-related information and optionally about a plurality of content pieces of the plurality of defined types, content selection and response constraints 327*b* and optionally other content selection instructions to provide to one or more trained LLMs 151, optionally other AUSDIP system data 327*c*, and/or various other types of optional additional information 329.

Some or all of the user client computing devices 360 (e.g., mobile devices), external devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or AUSDIP client program 368 optionally executing in memory to interact with the AUSDIP system 140 and present or otherwise use query responses 367*a* and/or push messages 367*b* that are received from the AUSDIP system, such as in response to submitted user queries 366 or as otherwise initiated by the AUSDIP system.

While particular components are not illustrated for the other devices/systems 380 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated AUSDIP system 140 may in some embodiments be distributed in various components, some of the described functionality of the AUSDIP system 140 may not be provided, and/or other additional functionality may be provided.

It will also be appreciated that, while various items are illustrated as being stored in memory or on storage while being used, these items or portions of them may be transferred between memory and other storage devices, such as for purposes of execution, memory management, data integrity, etc. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the AUSDIP system 140 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
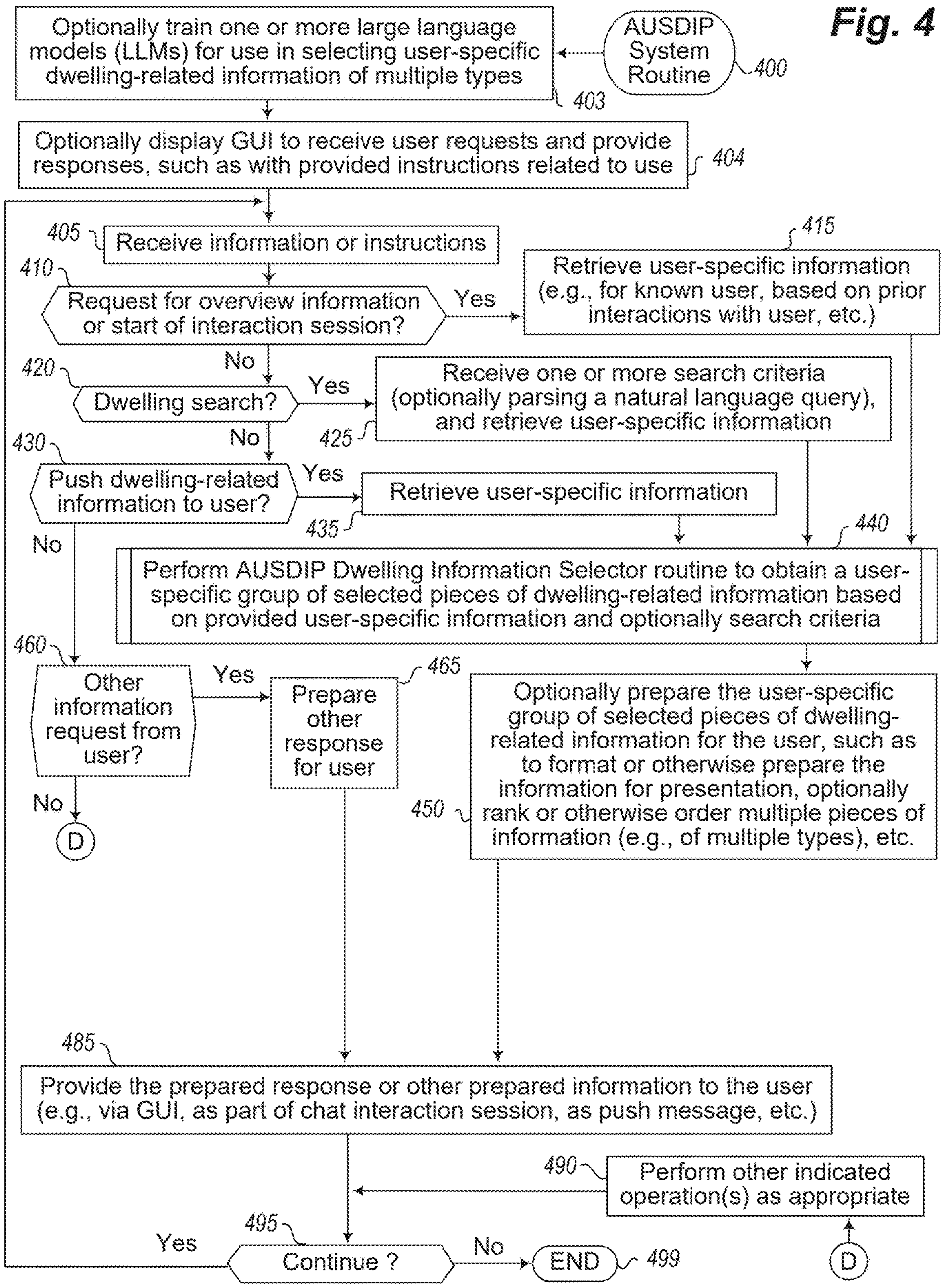
FIG. 4 illustrates a flow diagram of an example embodiment of an Automated User-Specific Dwelling Information Provider ("AUSDIP") system routine.

FIG. 4 is a flow diagram of an example embodiment of an AUSDIP system routine 400. The routine may be performed as a computer-implemented method provided by, for example, execution of the AUSDIP system 140 of FIGS. 1A-1B, and/or the AUSDIP system 140 of FIG. 3, and/or corresponding functionality discussed with respect to FIGS. 2A-2E and elsewhere herein, such as to perform automated operations related to automatically determining data about a user and using the user data along with additional generated prompt instructions as input to a trained LLM to cause the LLM to select dwelling-related information for the user. In the illustrated embodiment, the routine interacts with a single user at a time, such as to provide dwelling-related information of multiple types (e.g., responses to search queries and other requests from that user, push electronic messages, etc.), but it will be appreciated that the routine may interact in a similar manner with multiple users (e.g., sequentially or concurrently), and that the routine may in other embodiments perform similar types of activities for other types of information.

In the illustrated embodiment, the routine 400 begins at 403, where it optionally trains one or more LLMs (e.g., transformer-based neural network models) for use in selecting user-specific groups of content pieces from available content pieces with a plurality of defined types of dwelling-related information, such as using the AUSDIP Dwelling Information Selector LLM Trainer component as discussed further with respect to FIG. 1A. The routine continues to block 404, where it optionally displays a GUI to a current user to receive user requests and/or provide dwelling-related information, and in 405 receives information or instructions, such as a request from the user via the GUI. In block 410, the routine determines whether the instructions or other information received in block 405 are a request for overview information or otherwise is the start of an interaction session, and if so the routine continues to block 415 to retrieve or otherwise determine user-specific information for the user (e.g., based on prior interactions with the user, based on stored information for a known user, etc.), and otherwise continues to block 420 to determine if the instructions or other information received in block 405 is a request for dwelling information (e.g., a dwelling search request). If it is determined in block 420 that a request for dwelling information is received, the routine continues to block 425 to receive one or more search criteria and to retrieve or otherwise determine user-specific information for the user, and otherwise continues to block 430 to determine if the instructions or other information received in block 405 are to push dwelling-related information to a particular user, and if so continues to block 435 to retrieve user-specific information for the user.

After blocks 415, 425 or 435, the routine continues to block 440 to perform the AUSDIP Dwelling Information Selector routine to obtain a user-specific group of selected content pieces of dwelling-related information from content pieces of multiple defined types of dwelling-related information based on the obtained user-specific information from blocks 415 or 425 or 435 and optionally further based on search criteria (from block 425 if a dwelling search is being performed). After the group of selected content pieces is received as output from block 440, the routine continues to block 450 to optionally prepare the group of selected content pieces for the user, such as to format or otherwise prepare the information for presentation, to optionally rank or otherwise order multiple content pieces (e.g., multiple content pieces of multiple defined types), etc.

if it is instead determined in block 430 that the instructions or other information received in block 405 are not instructions to push dwelling-related information to a particular user, the routine continues instead to block 460, where determines if the instructions or other information received in block 405 are another type of information request from the user, and if so the routine continues to block 465 to generate another type of response to be provided to the user. After blocks 450 or 465, the routine continues to block 485 to provide the prepared response of block 465 or the prepared selected content pieces of block 450 to the user, such as via presentation in a displayed GUI, transmission in one or more electronic messages, etc.

If it is instead determined in block 460 that the received instructions or other information in block 405 is not a request from the user for other types of information, the routine in block 490 proceeds to perform one or more other indicated operations as appropriate, with non-exclusive examples of such other operations including retrieving and providing previously determined or generated information (e.g., previous user queries, previously determined responses to user queries, previous push messages, etc.), receiving and storing information for later use (e.g., information about dwelling data 321, other dwelling-related information 322, user data 328, AUSDIP system data 327, etc.), responding to other types of search queries (e.g., using user-specified filters), receiving and using feedback from a user in response to provided information, providing information about how one or more previous query responses were determined, performing housekeeping operations, etc.

After blocks 485 or 490, the routine continues to block 495 to determine whether to continue, such as until an explicit indication to terminate is received (or alternatively only if an explicit indication to continue is received). If it is determined to continue, the routine returns to block 405 to await further information or instructions from the same user, and if not continues to block 499 and ends.

Figure 5:
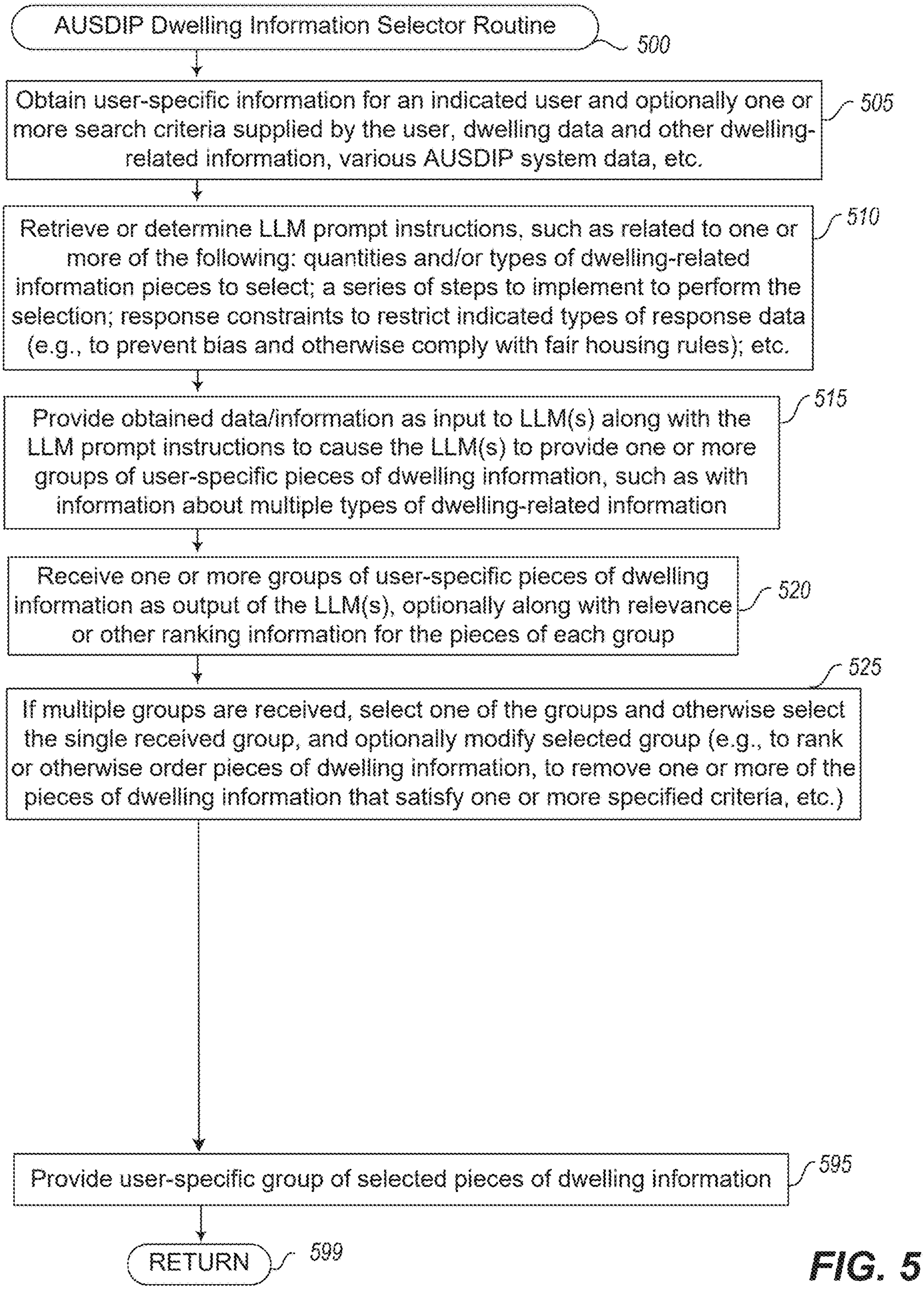
FIG. 5 illustrates a flow diagram of an example embodiment of an AUSDIP Dwelling Information Selector component routine.

FIG. 5 is a flow diagram of an example embodiment of an AUSDIP Dwelling Information Selector routine 500. The routine may be performed as a computer-implemented method provided by, for example, execution of the AUSDIP Dwelling Information Selector component 143 of FIGS. 1A-1B and/or a corresponding component (not shown) of the AUSDIP system 140 of FIG. 3 and/or with respect to corresponding functionality discussed with respect to FIGS. 2A-2E and elsewhere herein, such as to use one or more LLMs to generate a user-specific group of selected content pieces with dwelling-related information for a particular user (e.g., by generating contextual data for current activities and other prompt instructions that are supplied to the LLM (s) to cause the LLM(s) to select the user-specific group of selected content pieces with dwelling-related information from a plurality of content pieces having a plurality of defined types of dwelling-related information). In addition, in at least some situations, the routine 500 may be performed based on execution of block 440 of FIG. 4, with resulting information provided and execution control returning to that location when the routine 500 ends—in other embodiments, the routine may be invoked in other manners. In this example, the routine 500 is performed using particular ways to generate LLM prompt instructions that include associated contextual data and information about multiple available defined types of dwelling-related information and/or about multiple available content pieces of the multiple available defined types of dwelling-related information, but in other embodiments may use other techniques to prompt the same or other types of user-specific content selection models, whether in addition to or instead of the illustrated types of techniques.

The illustrated embodiment of the routine 500 begins at block 505, where the routine obtains user-specific information for an indicated user and optionally one or more search criteria supplied by the user or other indicated criteria associated with the user, dwelling data and other dwelling-related information, various AUSDIP system data (e.g., about LLM prompt instructions to use), etc., optionally including information about multiple types of available dwelling-related information and about available pieces of dwelling-related information of each of the multiple types. The routine then continues to block 510 to retrieve or otherwise determine LLM prompt instructions to supply to the one or more LLMs, such as related to one or more of the following: quantities and/or types of dwelling-related information content pieces to select; a series of steps or actions to implement to perform the selection; content response constraints to restrict indicated types of response data, such as to prevent bias and/or to otherwise comply with fair housing rules; etc.—in some embodiments and situations, the same LLM prompt instructions are used for multiple different LLM interactions for different users, but with different contextual data for each user and/or interaction. In block 515, the routine then interacts with the one or more LLM's to provide input instructions that includes the contextual data and the generated LLM prompt instructions, and optionally further including information about the multiple types of available dwelling-related information from which to select content pieces and/or the multiple content pieces of dwelling-related information of each of the multiple types for use in the selection (e.g., all defined types of available dwelling-related information and/or all available content pieces of dwelling-related information, or optionally with one or both filtered by the routine for the current interaction, such as based on one or more criteria being satisfied). In block 520, the routine receives one or more groups of user-specific content pieces of dwelling information as output of the LLM(s), optionally along with relevance or other ranking information for the pieces of each group. In block 525, the routine selects a group of content pieces (e.g., from multiple groups of content pieces if multiple are received, or to instead select a single group of content pieces that is received), and optionally modifies the selected group (e.g., to rank or otherwise order content pieces of dwelling-related information, to remove one or more of the content pieces of dwelling-related information that satisfy one or more specified criteria, to otherwise format or prepare the content pieces for presentation, etc.). The resulting selected group of content pieces, optionally as modified in block 525, are then provided in block 595 as the user-specific group of selected content pieces with dwelling-related information for the particular user. The routine then continues to block 599 and returns, such as to return to the flow of FIG. 4 at block 440 if invoked from there.

Figure 6:
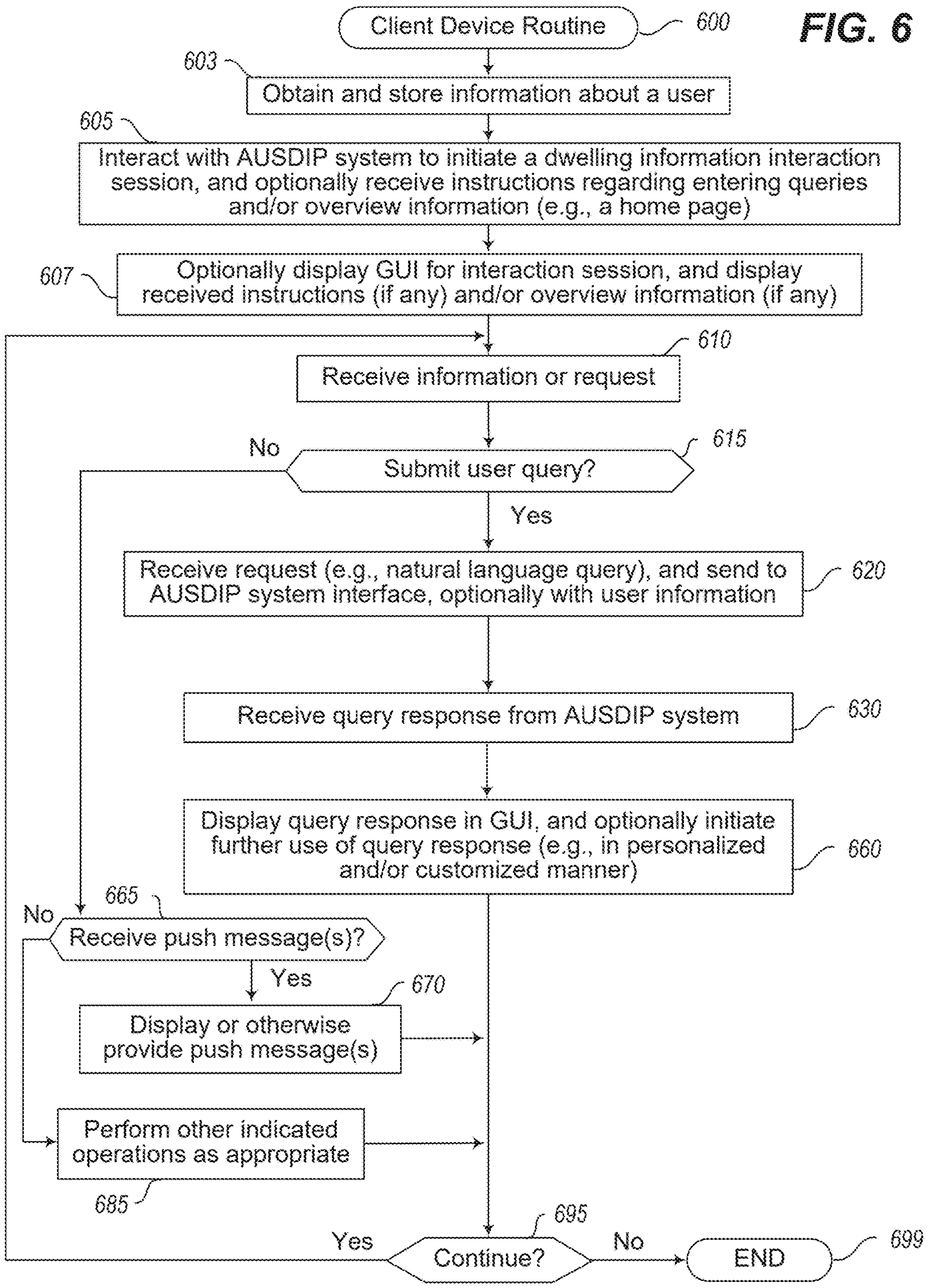
FIG. 6 illustrates a flow diagram of an example embodiment of a client device routine.

FIG. 6 is a flow diagram of an example embodiment of a client device routine 600. The routine may be performed by a computer-implemented method provided by, for example, operations of a client computing device 360 of FIGS. 1A-1B and/or a client computing device 360 of FIG. 3 and/or with respect to corresponding functionality discussed with respect to FIGS. 2A-2E and elsewhere herein, such as to interact with users or other entities who submit queries (or other requests or information) to the AUSDIP system, to receive responsive answers (or other information) from the AUSDIP system, and to optionally use the received information in one or more manners (e.g., to automatically initiate follow-up activities in accordance with a received responsive answer or other received information).

The illustrated embodiment of the routine 600 begins at block 603, where information is optionally obtained and stored about the user, such as for later use in personalizing or otherwise customizing further actions to that user. The routine then continues to block 605 to interact with the AUSDIP system to initiate an interaction session (e.g., in response to a corresponding instruction from the user), as well as to optionally receive a greeting and/or introductory instructions regarding using a GUI of the AUSDIP system and/or other overview information from the AUDSIP system, such as by displaying a GUI for the interaction session in block 607 in which the received greeting and/or introductory instructions (if any) and/or overview information (if any) are optionally displayed—in some embodiments, the overview information that is received from the AUSDIP system and displayed in block 607 may be a home page or other initial interaction screen that is generated by the AUSDIP Dwelling Information Selector routine 500 and/or AUSDIP Dwelling Information Selector component 143, such as illustrated in FIG. 1A with respect to elements 161 and 153*a*, and in FIGS. 1B and 5.

After block 607, the routine then continues to perform blocks 610-685 as part of participating in the interaction session or otherwise receiving push messages sent from the AUSDIP system. In particular, the routine continues to block 610 after block 607, where it waits until information or a request is received (e.g., a request and/or information from the user, information from the AUSDIP system, etc.). In block 615, the routine determines if the information or request received in block 610 is a request from the user to submit to the AUSDIP system, such as a search query in a natural language format (e.g., freeform text), and if not continues to block 665. Otherwise, the routine continues to block 620, where it sends the received query to the AUSDIP system interface, optionally along with additional information about the user from block 603, to obtain a corresponding responsive answer—in other embodiments, the routine may further modify the received user query to personalize and/or customize the information to be provided to the AUSDIP system (e.g., to add information specific to the user, such as location, device type, demographic information, preference information, etc.). In block 630, the routine then receives a responsive answer to the query from the AUSDIP system, and in block 660 displays the received query response in the GUI, and optionally initiates further use of the query response in one or more manners (e.g., in a manner that is personalized and/or customized for the user)—in some embodiments, the further initiated activities may include invoking of other functionality of the AUSDIP system, such as to initiate an inspection process for a selected dwelling indicated in dwelling information search results, to initiate a mortgage application process for a selected dwelling indicated in dwelling information search results, to initiate matching the user with a real estate professional as part of a housing search based on corresponding response information received from the AUSDIP system, etc.

In block 665, the routine determines if the information or request received in block 610 is one or more push electronic messages sent by the AUSDIP system, and if so continues to block 670 to display or otherwise provide the received electronic messages to the user (e.g., stores the received electronic messages in a queue for later retrieval by the user)—in some embodiments and situations, such a displayed or otherwise provided electronic message may include one or more user-selectable controls that, if selected by the user, initiate further interactions with the AUSDIP system or otherwise initiate further activities of one or more types. If it is instead determined in block 665 that the information or request received in block 610 is not one or more push electronic messages, the routine continues to block 685 to instead perform one or more other indicated operations as appropriate, with non-exclusive examples including sending information to the AUSDIP system of other types (e.g., based on selections by the user of provided user-selectable controls for previous information received from the AUSDIP system), receiving and storing user data for later use in personalization and/or customization activities, receiving and responding to requests for information about previous user queries and/or corresponding responsive answers for a current user and/or client device, receiving and responding to indications of one or more housekeeping activities to perform, etc. After blocks 660, 670 or 685, the routine continues to block 695 to determine whether to continue, such as until an explicit indication to terminate is received (or alternatively only if an explicit indication to continue is received). If it is determined to continue, the routine returns to block 610, and if not continues to block 699 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention.

Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:

training, by one or more computing devices, a large language model (LLM) to select dwelling-related information of a plurality of predefined types for users based at least in part on information specific to the users, wherein the plurality of predefined types of dwelling-related information include a plurality of enumerated dwelling-type categories and further include one or more types of functionality available related to dwelling acquisition;

performing, by the one or more computing devices, a plurality of interactions with an indicated user that include providing the indicated user with information about a plurality of dwellings that are available for at least one of acquisition or occupancy from one or more dwelling-type categories of a plurality of enumerated dwelling-type categories, wherein the plurality of interactions include receiving selections by the indicated user of multiple dwellings of the plurality of dwellings;

determining, by the one or more computing devices and based at least in part on the plurality of interactions, a description of the indicated user that is based on one or more attributes of the indicated user and on the selections by the indicated user of the multiple dwellings and on the one or more dwelling-type categories;

receiving, by the one or more computing devices and after the plurality of interactions, a search request from the indicated user for information about additional dwellings that satisfy one or more search criteria;

determining, by the one or more computing devices, multiple of the plurality of predefined types of dwelling-related information to use in providing additional dwelling-related information for the indicated user in response to the search request, wherein the multiple predefined types of dwelling-related information to use include information about dwellings for at least one of the plurality of enumerated dwelling-type categories and further include information about at least one of the one or more types of functionality available related to dwelling acquisition;

generating, by the one or more computing devices, contextual data for the indicated user that includes the determined description of the indicated user, and includes the one or more search criteria, and includes information about the multiple predefined types of dwelling-related information, and includes indications of a plurality of available content pieces that are of the multiple predefined types of dwelling-related information and that include an additional plurality of dwellings separate from the plurality of dwellings;

generating, by the one or more computing devices, instructions to provide to the trained LLM to cause the trained LLM to identify the additional dwelling-related information for the indicated user, wherein the generated instructions indicate to use a supplied copy of the generated contextual data for the indicated user for identifying of the additional dwelling-related information and further include information about how to perform a selection of multiple content pieces for the indicated user from the plurality of available content pieces, wherein the information about how to perform the selection of the multiple content pieces includes one or more content selection constraints to prevent bias in the selection by the trained LLM of the multiple content pieces, and wherein the determined description of the indicated user included in the supplied copy of the generated contextual data excludes one or more types of demographic information for the indicated user to further inhibit the bias;

receiving, by the one or more computing devices and in response to providing the generated instructions to the trained LLM, the identified additional dwelling-related information for the indicated user from the trained LLM, the identified additional dwelling-related information including the multiple content pieces selected by the trained LLM for the indicated user, wherein the additional dwelling-related information includes search results with first content pieces of the multiple content pieces that describe the additional dwellings satisfying the one or more search criteria and further includes at least one second content piece of the multiple content pieces with information about at least one of the types of functionality available related to dwelling acquisition; and presenting, by the one or more computing devices and in a displayed graphical user interface (GUI), the identified additional dwelling-related information to the indicated user in response to the search request along with user-selectable controls for the indicated user to select to receive further information about one or more of the additional dwellings via associated respective first content pieces displayed in the GUI, and for the indicated user to select to receive further information about the at least one types of functionality available related to dwelling acquisition via associated respective second content pieces displayed in the GUI.

2. The computer-implemented method of claim 1 wherein the one or more content selection constraints to prevent bias in the selection by the trained LLM include constraints to prevent violations of fair housing rules, and wherein the information about how to perform the selection of the multiple content pieces further includes instructions about a quantity of the multiple content pieces to select and about variations in types of the multiple content pieces to include at least the first content pieces and the at least one second content piece and about a sequence of multiple actions to perform.

3. The computer-implemented method of claim 1 wherein the plurality of interactions with the indicated user further include providing the indicated user with information about multiple types of functionality available related to dwelling acquisition and receiving a selection by the indicated user of one of the multiple types of functionality, wherein the determining of the description of the indicated user is further based in part on the selection of the one type of functionality, wherein the at least one second content piece selected by the trained LLM includes information about at least one available service that the indicated user can use to obtain one of the multiple types of functionality different from the one type of functionality, and wherein the first content pieces each includes summary information of one or more types for a respective one of the additional dwellings.

4. A computer-implemented method comprising:

performing, by one or more computing devices, a plurality of interactions with a user to provide functionality to the user associated with a plurality of dwellings that are available to at least one of acquire or occupy, including receiving selections by the user of multiple dwellings of the plurality of dwellings;

determining, by the one or more computing devices and based least in part on the plurality of interactions, a user description that reflects activities of the user performed as part of identifying a dwelling for at least one of acquisition or occupancy;

receiving, by the one or more computing devices and after the plurality of interactions, a request from the user for dwelling-related information that satisfies one or more indicated criteria;

generating, by the one or more computing devices, instructions to provide to a large language model (LLM) to cause the LLM to identify the dwelling-related information for the request by selecting multiple content pieces for the user from a plurality of content pieces having a plurality of defined types of dwelling-related information, wherein the generated instructions include contextual data having a supplied copy of the determined user description and having the one or more indicated criteria and having information about the plurality of defined types of dwelling-related information, and wherein the generated instructions further include information about how the LLM is to perform a selection of the multiple content pieces for the user based at least in part on the contextual data, the information about how the LLM is to perform the selection of the multiple content pieces including one or more content selection constraints for the LLM to use to inhibit bias in the selection by the LLM of the multiple content pieces, and the supplied copy of the determined user description having one or more types of demographic information being excluded to further inhibit the bias;

receiving, by the one or more computing devices and in response to providing the generated instructions to the LLM, information about the multiple content pieces selected by the LLM for the user, wherein the multiple content pieces include one or more content pieces that each identifies a respective one of the plurality of dwellings separate from the multiple dwellings and further include at least one content piece with information that is not specific to any one of the plurality of dwellings; and presenting, by the one or more computing devices, the multiple content pieces to the user in response to the request.

5. The computer-implemented method of claim 4 wherein the one or more content selection constraints for the LLM to use include information to prevent violations of fair housing rules in the selection by the LLM of the multiple content pieces.

6. The computer-implemented method of claim 4 wherein the information about how the LLM is to perform the selection of the multiple content pieces includes instructions for the LLM about at least one of a quantity of the multiple content pieces to select, or a sequence of actions to perform as part of the selection, or one or more of the plurality of defined types of dwelling-related information to include in the multiple content pieces, or one or more rules to use to select the multiple content pieces to satisfy one or more specified business criteria.

7. The computer-implemented method of claim 4 wherein the generated instructions further include indications of the plurality of content pieces from which to select the multiple content pieces, and indications of at least one of the multiple dwellings selected by the user, or of one or more types of the activities performed by the user.

8. The computer-implemented method of claim 4 wherein the generated instructions further include indications of multiple of a plurality of information types, the plurality of information types including a description of a group of users to which the user belongs, and a summary of dwellings most recently selected by the user, and information about activities of the user related to a financial capability of the user for the at least one of acquisition or occupancy of the identified dwelling, and information about activities of the user related to new construction dwellings, and activities of the user related to advertisements.

9. The computer-implemented method of claim 4 wherein the plurality of defined types of dwelling-related information include a first type houses including existing available for purchase, a second type including new houses available for purchase, a third type including condominiums available for purchase, a fourth type including houses available for rental, a fifth type including apartments available for rental, and wherein the one or more content pieces include a plurality of content pieces of multiple of the first and second and third and fourth and fifth types.

10. The computer-implemented method of claim 4 wherein the plurality of defined types of dwelling-related information include a first type of information about functionality related to determining financial capabilities of the user for the at least one of acquisition or occupancy of the identified dwelling, a second type of information about functionality related to obtaining financing from a lender for the at least one of acquisition or occupancy of the identified dwelling, a third type of functionality related to identifying a real estate agent to represent the user, and a fourth type of functionality related to services for at least one of dwelling inspection or dwelling repair, and wherein the at least one content piece includes a plurality of content pieces of multiple of the first and second and third and fourth types.

11. The computer-implemented method of claim 4 wherein the presenting of the multiple content pieces to the user includes at least one of presenting search results that include two or more content pieces each identifying a respective one of the plurality of dwellings, or presenting a response in a chatbot interface to a chatbot interaction from the user that includes the request, or presenting a home page of a site to the user in response to the request from the user that is for the home page.

12. The computer-implemented method of claim 4 wherein the performing of the plurality of the interactions with the user occur during an interaction session in which an identity of the user is unknown, and wherein the determining of the user description is further based on at least one of a detected geographical location of the user or a detected type of client device of the user.

13. The computer-implemented method of claim 4 wherein the presenting of the multiple content pieces to the user includes transmitting, by the one or more computing devices, the multiple content pieces over one or more computer networks to a client device associated with the user for display on the client device, and wherein the method further comprises training, by the one or more computing devices and before the providing of the generated instructions to the LLM, the LLM to select dwelling-related information of the plurality of defined types for multiple users based at least in part on information specific to the multiple users.

14. A system comprising:

one or more hardware processors of one or more computing devices; and one or more memories with stored instructions that, when executed by at least one of the one or more hardware processors, cause at least one computing device of the one or more computing devices to perform automated operations including at least:

determining a description specific to an indicated user that reflects actions of the indicated user in identifying a dwelling to at least one of acquire or occupy;

generating instructions to provide to a large language model (LLM) to cause the LLM to select multiple content pieces for the indicated user from a plurality of content pieces that have a plurality of defined types of dwelling-related information, wherein the generated instructions include contextual data having a supplied copy of the determined description and having information about the plurality of defined types of dwelling-related information, and wherein the generated instructions further include information about how the LLM is to perform a selection of the multiple content pieces for the indicated user based at least in part on the contextual data, the information about how the LLM is to perform the selection of the multiple content pieces including one or more content selection constraints for the LLM to use to inhibit bias in the selection by the LLM of the multiple content pieces, and the supplied copy of the determined description having one or more types of demographic information being excluded to further inhibit the bias;

receiving, in response to providing the generated instructions to the LLM, information about the multiple content pieces selected by the LLM for the indicated user, wherein the multiple content pieces include one or more content pieces that each identifies a respective one of a plurality of dwellings available for at least one of acquisition or occupation and further include at least one content piece with information that is not specific to any particular dwelling; and providing the multiple content pieces to the indicated user.

15. The system of claim 14 wherein the stored instructions include software instructions that, when executed by the at least one hardware processor, cause the at least one computing device to perform further automated operations including performing a plurality of interactions with the indicated user to provide functionality to the indicated user associated with the identifying of the dwelling to at least one of acquire or occupy, wherein the plurality of interactions include providing information to the indicated user about one or more dwellings of the plurality of dwellings, wherein the determining of the description of the indicated user is based at least in part on the plurality of interactions and includes adding one or more inferred attributes of the indicated user to the determined description and further includes adding information to the determined description about actions taken by the indicated user during the plurality of interactions, and wherein the providing of the multiple content pieces to the indicated user includes presenting the multiple content pieces to the indicated user in a displayed graphical user interface.

16. The system of claim 14 wherein the automated operations further include receiving a request from the indicated user for information about dwellings that satisfy one or more indicated criteria, wherein the generating of the instructions is performed in response to the request and includes adding the one or more indicated criteria to the contextual data, wherein one or more dwellings identified by the one or more content pieces satisfy the one or more indicated criteria, wherein the multiple content pieces include dwelling-related information of multiple defined types of the plurality of defined types, and wherein the at least one content piece includes information about at least one type of available functionality related to dwelling acquisition.

17. The system of claim 14 wherein the one or more content selection constraints include information to prevent violations of fair housing rules in the selection by the LLM of the multiple content pieces, and wherein the information about how the LLM is to perform the selection of the multiple content pieces further includes instructions about at least one of a quantity of the multiple content pieces to select or a sequence of actions to perform as part of the selection.

18. The system of claim 14 wherein the providing of the multiple content pieces to the indicated user is performed as part of a push message sent to a client device of the indicated user by an automated user-specific dwelling information provider system being executed by the one or more computing devices.

19. A non-transitory computer-readable medium having stored contents that cause one or more computing devices to perform automated operations, the automated operations including at least:

receiving, by the one or more computing devices, a request from a user for building-related information of one or more types;

determining, by the one or more computing devices, a description of the user that reflects a status of the user in identifying a building to at least one of acquire or occupy based at least in part on prior interactions with the user;

generating, by the one or more computing devices, instructions to provide to a large language model (LLM) to cause the LLM to identify the building-related information for the user by selecting multiple content pieces for the user from a plurality of available content pieces having a plurality of defined types of building-related information, wherein the plurality of defined types of building-related information include information about a plurality of buildings that are of one or more building types and are available for at least one of acquisition or occupation and further include information of one or more types that is not specific to particular buildings, wherein the generated instructions include contextual data having a supplied copy of the determined description of the user and having information about the plurality of defined types of building-related information, and wherein the generated instructions further include information about how the LLM is to perform a selection of the multiple content pieces for the user based at least in part on the contextual data, the information about how the LLM is to perform the selection of the multiple content pieces including one or more content selection constraints for the LLM to use to inhibit bias in the selection by the LLM of the multiple content pieces, and the supplied copy of the determined description having one or more types of demographic information being excluded to further inhibit the bias;

receiving, by the one or more computing devices and in response to providing the generated instructions to the LLM, information about the multiple content pieces selected by the LLM for the user, wherein the multiple content pieces include one or more content pieces that each identifies a respective one of the plurality of buildings; and providing, by the one or more computing devices, the multiple content pieces to the user.

20. The non-transitory computer-readable medium of claim 19 wherein the stored contents include software instructions that, when executed by the one or more computing devices, cause the one or more computing devices to perform further automated operations including performing a plurality of interactions with the user to provide functionality to the user associated with the identifying of the building to at least one of acquire or occupy, wherein the plurality of interactions include providing information to the user about one or more buildings of the plurality of buildings, wherein the determining of the description of the user is based at least in part on the plurality of interactions and includes adding one or more inferred attributes of the user to the determined description and further includes adding information to the determined description about actions taken by the user during the plurality of interactions, and wherein the providing of the multiple content pieces to the user includes presenting, by the one or more computing devices, the multiple content pieces to the user in a displayed graphical user interface.

21. The non-transitory computer-readable medium of claim 19 wherein the received request from the user includes a request for information about buildings that satisfy one or more indicated criteria, wherein the generated instructions further include indications of the one or more indicated criteria, wherein one or more buildings identified by the one or more content pieces satisfy the one or more indicated criteria, and wherein the multiple content pieces include building-related information of multiple defined types of the plurality of defined types and further include at least one content piece with information about at least one type of available functionality related to building acquisition.

22. The non-transitory computer-readable medium of claim 19 wherein the one or more content selection constraints for the LIM to use include information to prevent violations of fair housing rules in the selection by the LLM of the multiple content pieces, and wherein the information about how the LLM is to perform the selection of the multiple content pieces further includes instructions about at least one of a quantity of the multiple content pieces to select or a sequence of actions to perform as part of the selection.

* * * * *